United States Patent
Montgomery et al.

(10) Patent No.: US 10,281,640 B2
(45) Date of Patent: May 7, 2019

(54) LIGHT STEERING BACKLIGHT

(71) Applicant: Sharp Kabushiki Kaisha, Osaka (JP)

(72) Inventors: David James Montgomery, Oxford (GB); Peter John Roberts, Oxford (GB); Paul Antony Gass, Oxford (GB)

(73) Assignee: Sharp Kabushiki Kaisha, Osaka (JP)

(*) Notice: Subject to any disclaimer, the term of this patent is extended or adjusted under 35 U.S.C. 154(b) by 166 days.

(21) Appl. No.: 15/512,705

(22) PCT Filed: Sep. 16, 2015

(86) PCT No.: PCT/JP2015/004726
§ 371 (c)(1),
(2) Date: Mar. 20, 2017

(87) PCT Pub. No.: WO2016/047108
PCT Pub. Date: Mar. 31, 2016

(65) Prior Publication Data
US 2017/0242181 A1     Aug. 24, 2017

(30) Foreign Application Priority Data

Sep. 25, 2014  (GB) .................................. 1416885.0

(51) Int. Cl.
*F21V 8/00*    (2006.01)
*G02B 27/22*   (2018.01)

(52) U.S. Cl.
CPC .......... *G02B 6/0036* (2013.01); *G02B 6/002* (2013.01); *G02B 6/0033* (2013.01);
(Continued)

(58) Field of Classification Search
CPC .... G02B 6/0036; G02B 6/002; G02B 6/0033; G02B 6/0053; G02B 6/0068; G02B 6/0058; G02B 27/225
See application file for complete search history.

(56) References Cited

U.S. PATENT DOCUMENTS 7,970,246 B2    6/2011  Travis et al.
8,659,830 B2    2/2014  Brott et al.
(Continued)

FOREIGN PATENT DOCUMENTS

JP    2003-149639 A    5/2003
JP    2005-353544 A    12/2005
(Continued)

OTHER PUBLICATIONS

International Search Report for corresponding International Application No. PCT/JP2015/004726 dated Dec. 28, 2015.

*Primary Examiner* — Mary Ellen Bowman
(74) *Attorney, Agent, or Firm* — Renner Otto Boisselle & Sklar, LLP

(57) ABSTRACT

An illumination system comprises a lightguide (12) having a plurality of light extraction features (LEFs); and a plurality of independently controllable light sources (11a, 11b, 11c). The LEFs have a preferred direction, with light that is incident on an LEF along the preferred direction of the LEF being extracted from the lightguide generally parallel to a reference plane, and light that is incident on an LEF not along the preferred direction of the LEF being extracted from the lightguide at an extraction angle to the reference plane, the extraction angle being related by a response function to an incidence angle between the light propagation direction and the preferred direction of LEF. The shape of the LEFs varies with distance from a reference point or respective reference point so that the response function becomes larger with increasing distance of the LEFs from the reference point.

20 Claims, 36 Drawing Sheets

(52) U.S. Cl.
CPC ......... *G02B 6/0053* (2013.01); *G02B 6/0068* (2013.01); *G02B 6/0058* (2013.01); *G02B 27/225* (2013.01)

(56) References Cited

U.S. PATENT DOCUMENTS

| | | | |
|---|---|---|---|
| 2006/0221642 A1* | 10/2006 | Daiku | B60K 35/00 |
| | | | 362/626 |
| 2007/0236957 A1 | 10/2007 | Koganezawa et al. | |
| 2008/0316744 A1* | 12/2008 | Hirota | G02B 5/021 |
| | | | 362/247 |
| 2012/0243204 A1 | 9/2012 | Robinson | |
| 2012/0299913 A1 | 11/2012 | Robinson et al. | |

FOREIGN PATENT DOCUMENTS

| | | |
|---|---|---|
| JP | 2006-310269 A | 11/2006 |
| JP | 2007-279474 A | 10/2007 |
| WO | WO 2013/180725 A1 | 12/2013 |

* cited by examiner

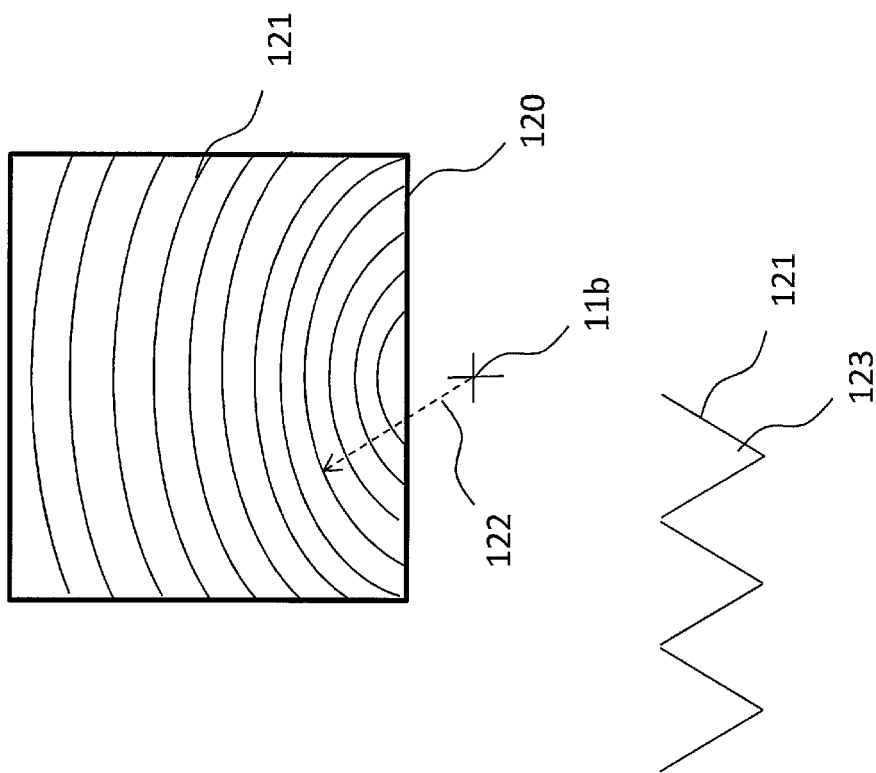
Figure 12b
Figure 12c
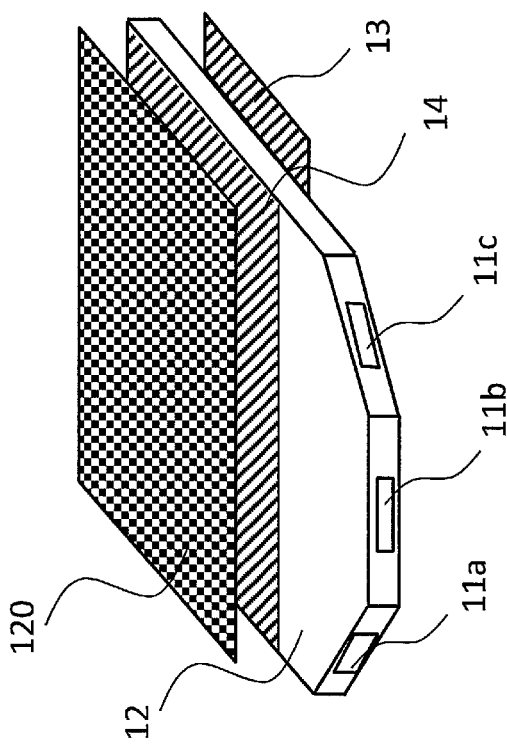
Figure 12a

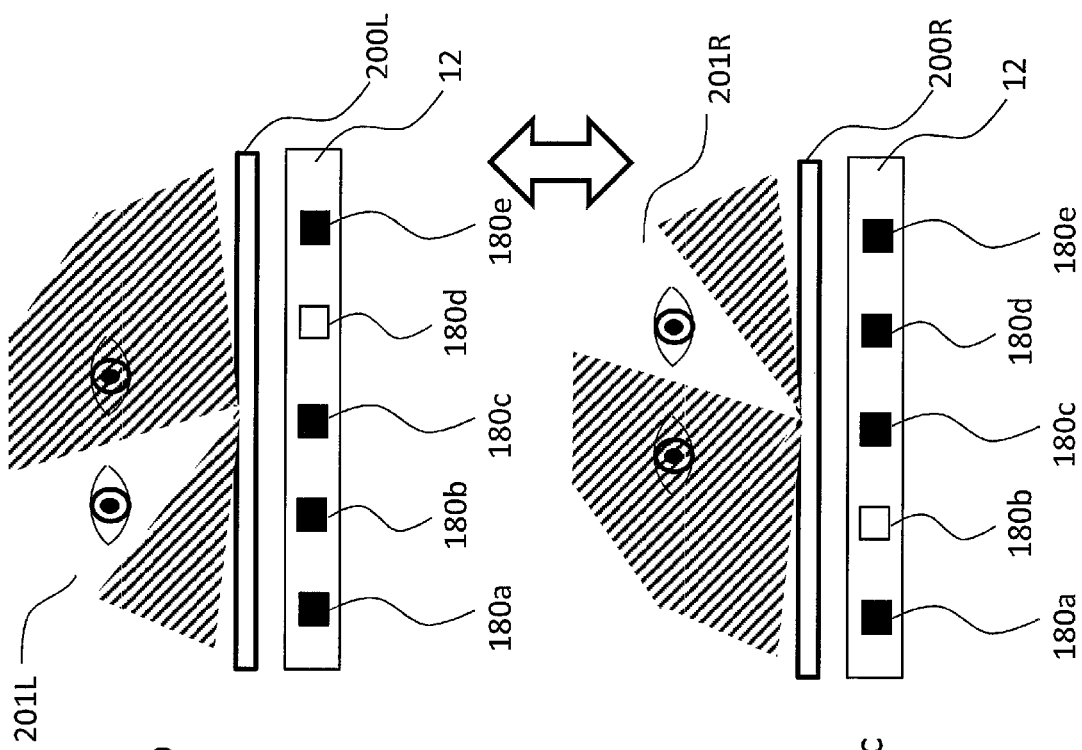
Figure 21b
Figure 21c
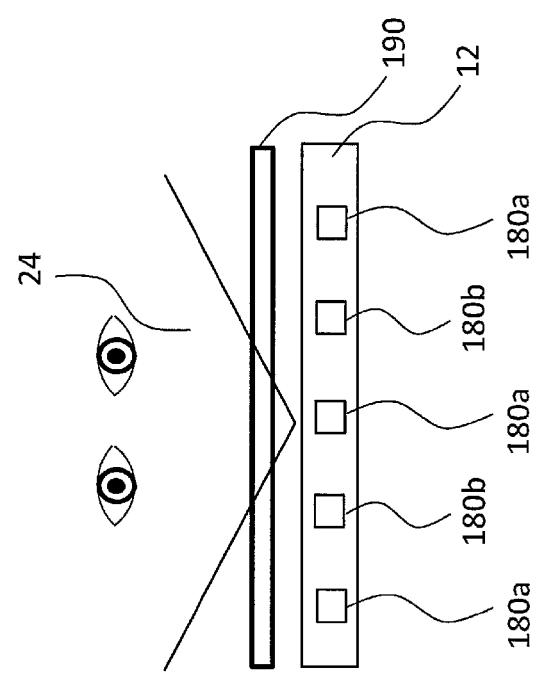
Figure 21a

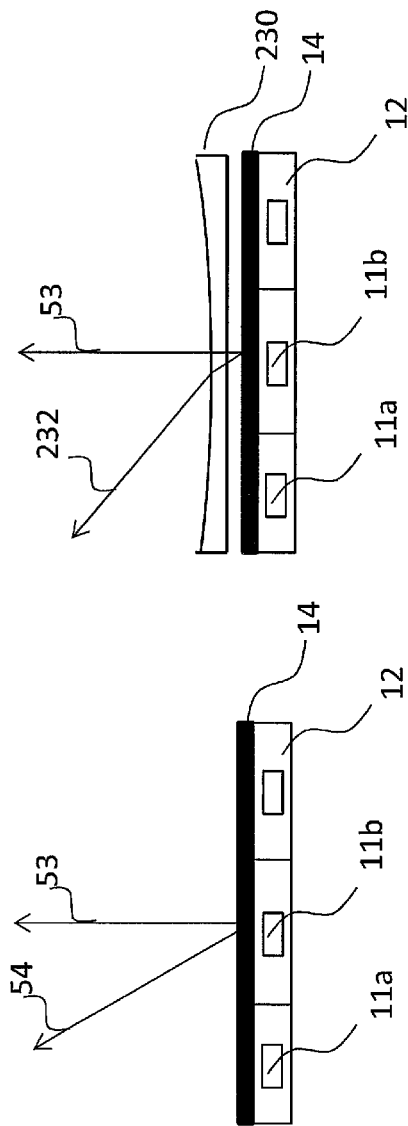
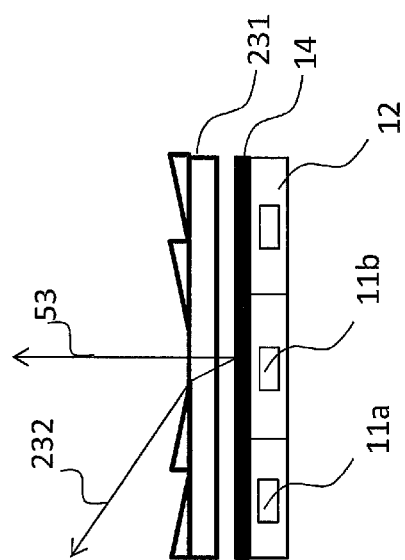
Figure 24a
Figure 24b
Figure 24c

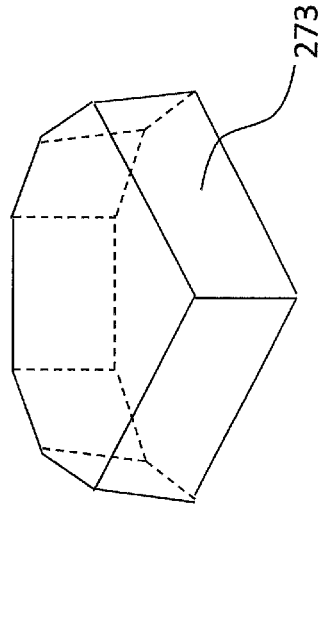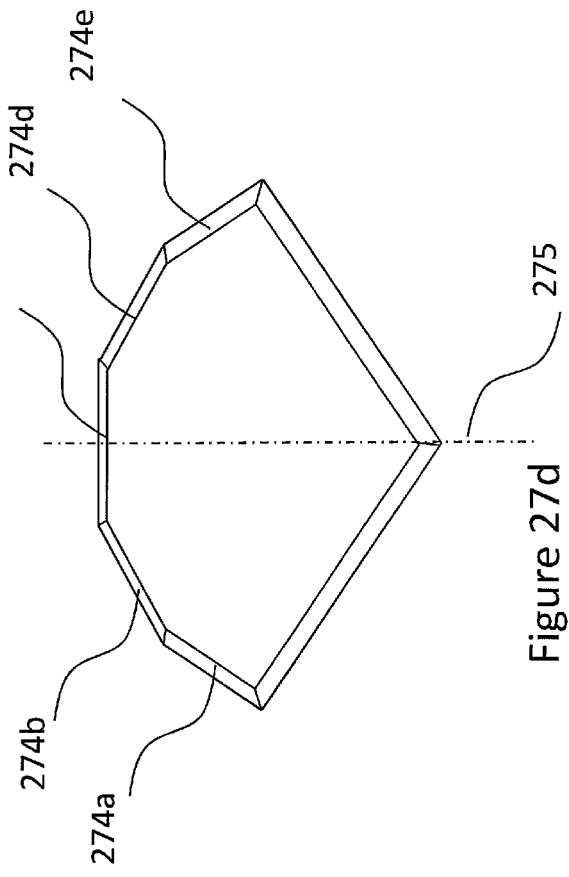
Figure 27c
Figure 27d
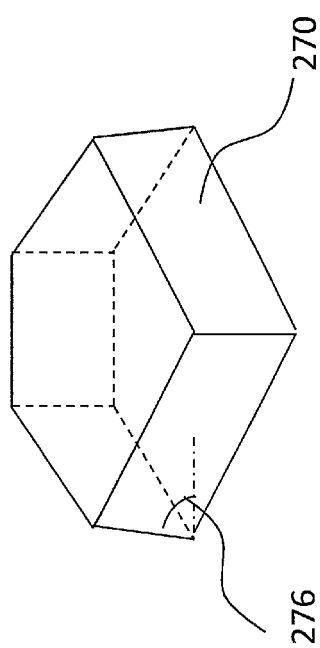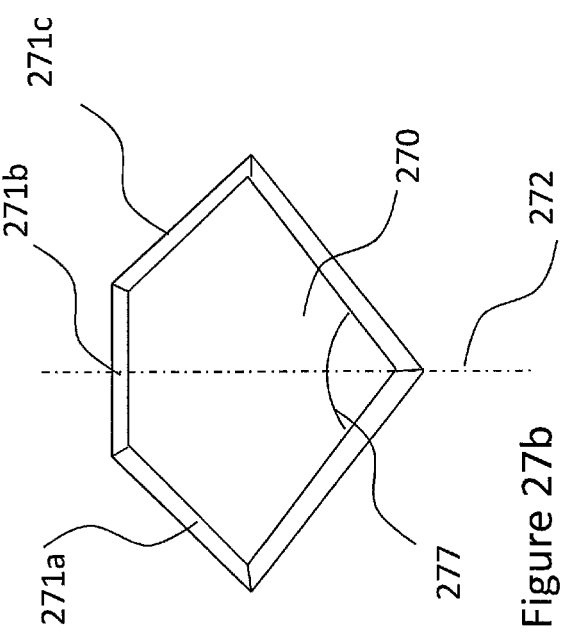
Figure 27a
Figure 27b

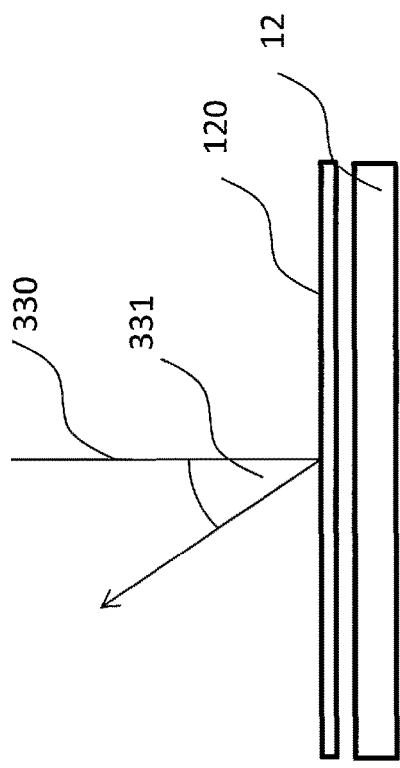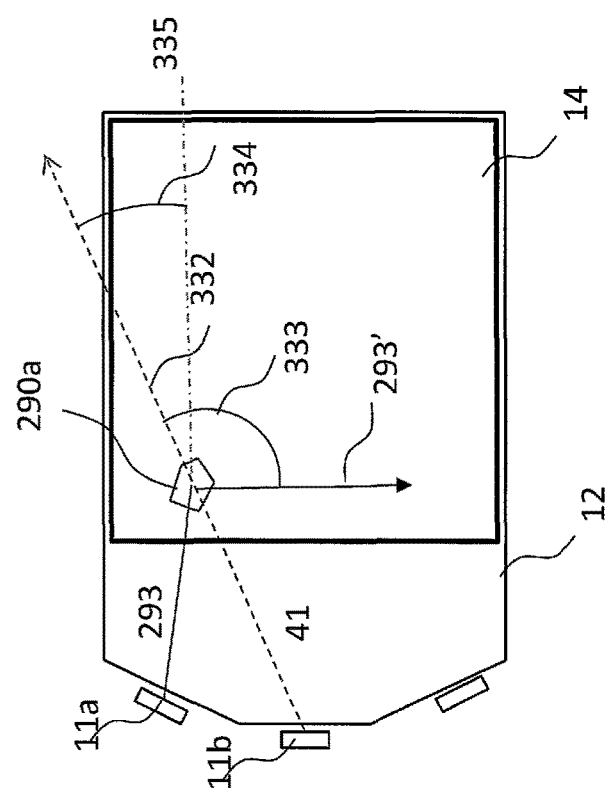
Figure 28a
Figure 28b

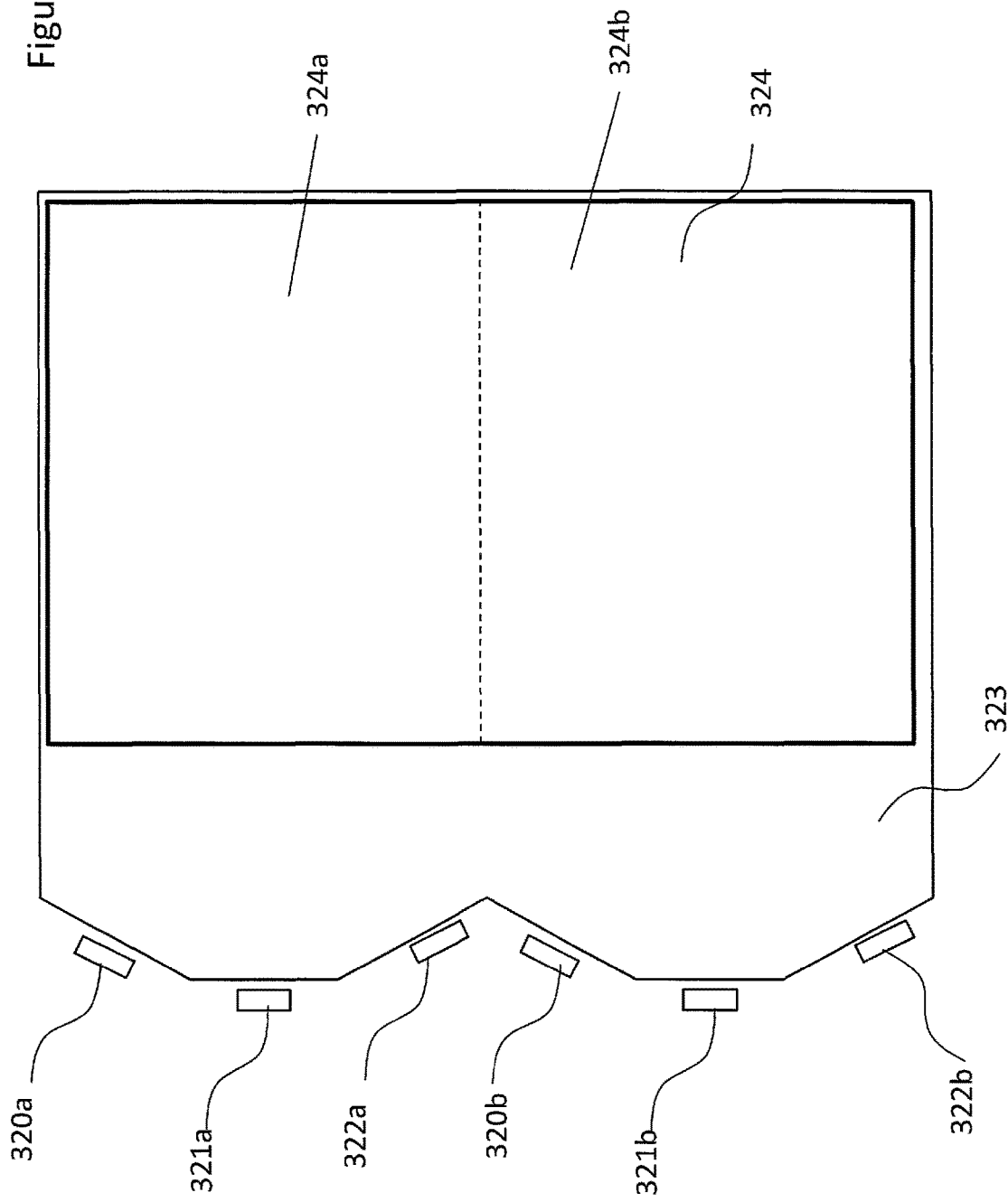

LIGHT STEERING BACKLIGHT

TECHNICAL FIELD

This patent concerns flat illuminators for backlighting or general lighting applications. Specifically this invention concerns high efficiency illuminators that achieve a high degree of efficiency by efficiently directing light to one or more viewers and is able to change the direction to which the light is directed by electronic means.

BACKGROUND ART

The electronic control of the light direction of a collimated flat illuminator is a difficult technical problem and hence there have been few solutions to this.

WO 2013/180725 (Hewlett Packard) describes a lightguide that has patterned nanostructured extraction features where different colours (for example lasers in-coupled to the lightguide) can be directed, by diffraction, on a pixel basis in different directions. The result of this is at different images can be viewed by viewers from different directions. The images are fixed and it is not possible to adjust the images or the directions once the lightguide has been made.

U.S. Pat. No. 8,659,830 (3M) illustrates a sequential autostereoscopic display with switchable viewing zones. In this invention an LCD is placed on a backlight. The backlight is able to switch sequentially between two viewing directions corresponding to the two eyes of a viewer. Alternative images in sequence to this switch are shown on the LCD and the viewer sees an autostereoscopic image. The backlight achieves this by having two sets of LEDs at opposing ends of the lightguide and extraction features that extract light in opposing directions. A symmetric film, consisting of aligned prisms and lenses on opposing faces, directs the two opposing light directions in the two directions required. The LEDs are then sequentially switched on and off.

U.S. Pat. No. 7,970,246 (Microsoft) describes an alternative approach where a lightguide is made in a tapered cross section with the taper towards a point light source. The far side of the lightguide is curved so as to reflect and collimate the light emerging from the light source and is then extracted by the light passing back down the taper. The extracted light is then turned using a turning film. The taper width and shape of lens is chosen to obtain a uniform extraction. Multiple light sources along the edge will form collimations in different directions depending on its location relative to the curved surface of the far end of the lightguide. The different collimation directions thus extracted in different directions.

A similar invention is proposed in US 2012/0299913 and US 2012/0243204 (RealD) where the nature of the extraction features differs only over the Microsoft invention.

SUMMARY OF INVENTION

A first aspect of the present invention provides an illumination system comprising: a lightguide having a plurality of light extraction features arranged to extract, through a light extraction surface of the lightguide, light propagating within the lightguide; and a plurality of independently controllable light sources arranged to introduce light into spatially separated parts of one edge face of the lightguide. The light extraction features has a preferred direction, such that light propagating within the lightguide that is incident on a light extraction feature along the preferred direction of the respective light extraction feature is extracted from the surface of the lightguide generally in a direction parallel to a reference plane crossed with the light extraction surface of the lightguide, and light propagating within the lightguide that is incident on a light extraction feature not along the preferred direction of the respective light extraction feature is extracted from the surface of the lightguide at a (generally non-zero) extraction angle to the reference plane, the extraction angle being related by a response function to an incidence angle between the light propagation direction and the preferred direction of the light extraction feature. The light extraction features are oriented such that the respective preferred directions of the light extraction feature are directed towards a reference point, or towards a respective reference point. The light extraction features are configured such that the response function of the light extraction features strengthens (that is, becomes larger) with increasing distance from the reference point or from the respective reference point.

The reference point(s) may be on the one edge face, but the invention is not limited to this. For example, in a case where there is no light source at the reference point(s), there need not be an edge face at the reference point(s).

By stating that the response function becomes "larger" is meant that, for a given change in the incidence angle, there is a larger change in the extraction angle. As the distance between the light extraction features and the input edge face of the lightguide increases, the angular separation between light arriving at a particular light extraction feature from two of the light sources decreases—and making the response function larger with increasing distance of the light extraction features from the reference point or respective reference point can compensate for this decrease. Optionally, the response function is arranged to vary with distance from the reference point or respective reference point in such a way that, for each one of the light sources, the extraction angle for light from a particular light source is substantially constant over the lightguide, regardless of the distance from the reference point or respective reference point. Each light source, when switched on, illuminate substantially the entire light-emitting area of the lightguide (where the light emitting area of the lightguide is the area of the lightguide where light extraction features are provided). Thus, the effect of switching a particular light source on is to generate an illuminated region extending along the length of the active area of the lightguide and centred around the extraction angle for that light source. By selecting which one(s) of the light sources on switched on, it is possible to control the illumination pattern provided by the illumination system The shape, at the light extraction surface, of the light extraction features may be arranged to vary with distance from the reference point or respective reference point. The response function between the incident angle and the extraction angle light extraction depends on the shape of the light extraction features, and arranging the shape of the light extraction features to vary with increasing distance from the reference point or respective reference point is a convenient way of obtaining a response function that increases with increasing distance from the reference point or respective reference point.

An aspect ratio of the light extraction features may decrease with distance from the reference point or respective reference point, the aspect ratio of the light extraction feature being the extent, at the light extraction surface, of the light extraction feature in the preferred direction divided by the extent, at the light extraction surface, of the light extraction feature in a direction perpendicular to the preferred direction.

The extent, at the light extraction surface, of the light extraction feature in the preferred direction may not increase as the distance of the light extraction feature from the reference point or respective reference point increases.

The reference plane may be perpendicular to the light extraction surface.

As the distance from the reference point or respective reference point increases the intensity of light propagating in the lightguide decreases as light is extracted from the waveguide. To compensate for this, the number of light extraction features per unit area may increase with distance from the reference point or respective reference point. Additionally or alternatively the area, at the light extraction surface, of the light extraction features may increase with distance from the reference point or respective reference point.

At the light extraction surface, the light extraction features may be generally circular or generally elliptical. Alternatively, at the light extraction surface, the light extraction features may be polygonal approximations to a circle or ellipse—it is expected that a light extraction feature with a polygonal section (as seen from above) may be easier to fabricate than a circular or elliptical light extraction feature.

Light paths from different light sources will have different path lengths to a given light extraction feature and, if the light sources have the same intensity as one another, the intensity of light arriving at a light extraction will therefore vary between light sources since the greater the path length the greater is the proportion of light propagating along that path that is extracted. To compensate for this, the light extraction features may contain at least one face that extends generally parallel to the preferred direction of the light extraction feature. Light propagating along the preferred direction of a light extraction feature (which generally will have the shortest path length) will not significantly be redirected by this surface, whereas light propagating at an angle to the preferred direction will be extracted by this surface.

The light extraction surface, the light extraction features may be T-shaped and may be oriented with the stem of the T extending along the preferred direction.

The light extraction features may be asymmetric about their preferred direction.

The light extraction features may have a common reference point and the illumination system may be mirror-symmetric about a longitudinal axis passing through the reference point.

The light sources may be arranged symmetrically about the longitudinal axis.

Alternatively, sets of light extraction features may be provided in/on respective sub-areas of the lightguide, each set of light extraction features may have a respective reference point; and the light sources may be arranged in sets for, when illuminated, directing light into respective sub-areas of the lightguide. In this embodiment, the light sources of one set may be arranged symmetrically about the longitudinal axis of the respective sub-area. Also in this embodiment each set may include at least a first light source arranged to introduce light into the respective sub-area of the waveguide along a first direction and a second light source arranged to introduce light into the respective sub-area of the waveguide along a second direction different from the first direction.

The shape, at the light extraction surface, of light extraction feature at a location at one side of the longitudinal axis may be mirror symmetric with the shape, at the light extraction surface, of a corresponding light extraction feature at a mirror symmetric location at the other side of the longitudinal axis.

One of the light sources may be disposed adjacent the reference point. Alternatively, where sets of light extraction features are provided with each set of light extraction features having a respective reference point, one of the light sources of a set of light sources may be disposed adjacent the reference point of the associated set of light extraction features The illumination system may further comprise an optical turning film disposed over the light extraction surface of the lightguide. The turning film may increase or decrease the angle between light emitted by the illumination system when one light source is switched on and light emitted by the illumination system when another light source is switched on, as desired for a particular application.

Optical elements of the optical turning film may be arranged in concentric arcs. The centre of the concentric arcs may be vertically above the reference point (in a case where the light extraction features have a common reference point). Alternatively, in an embodiment in which sets of light extraction features are provided, with each set of light extraction features having a respective reference point, the optical elements of the optical turning film may be arranged in sets of concentric arcs, with each set of concentric arcs having its centre vertically above a respective reference point.

The one edge face may comprise a plurality of facets, and each of the light sources may be arranged to introduce light into a respective facet.

The light extraction surface of the lightguide may be substantially flat.

The illumination system may comprise three or more independently controllable light sources.

The illumination system may have n independently controllable light sources or a set of light sources may include n independently controllable light sources, and the cross-section, at the light extraction surface, of the light extraction features may be polygonal with n+2 sides, with n sides facing away from the light sources or from the respective set of light sources and two sides facing towards the light sources or towards the respective set of light sources.

Each light extraction feature may be arranged with its central axis directed towards the reference point or towards the respective reference point.

The angle between the central axis of an extraction feature and the adjacent side of the extraction feature may vary with distance of the extraction feature from the light sources or from the respective set of light sources.

The angle between the central axis of an extraction feature and the adjacent side of the extraction feature may decrease with increasing distance of the extraction feature from the light sources or from the respective set of light sources.

The angle between the central axis of an extraction feature and the adjacent side of the extraction feature may vary with offset of the extraction feature from the symmetry axis of the lightguide or from the symmetry axis of a respective sub-area of the lightguide.

The light extraction features may extend perpendicular to the light extraction surface, and the cross section, parallel to the light extraction surface, of a light extraction feature at one height above the light extraction surface may be similar to the cross section, parallel to the light extraction surface, of the feature at another height above the light extraction surface. The term "similar" is used herein in its mathematical sense, in that two cross-sections are "similar" to one another if one is a re-scaling of the other.

The cross-sectional area, parallel to the light extraction surface, of a light extraction feature reduces with increasing height above the light extraction surface. In this case the edge faces of the light extraction feature are inclined with respect to the light extraction surface, rather than perpendicular to it.

A second aspect of the invention provides a display comprising an illumination system of the first aspect and a spatial light modulator (SLM) disposed in the path of light from the illumination system to an observer. The illumination system acts as a backlight to illuminate the spatial light modulator. By selecting which one(s) of the light sources are illuminated in conjunction with controlling the image(s) displayed on the SLM it is possible to operate the display in one of a number of possible modes including for example a conventional wide angle display (by displaying a single image on the spatial light modulator and switching all the light sources ON to obtain a wide illumination pattern), a narrow angle display (by displaying a single image on the spatial light modulator and switching only one light sources ON to obtain a narrow illumination pattern), or a multiple view directional display (by displaying two or more interlaced images on the spatial light modulator and switching ON the same number of light sources as displayed images so that each image is directed to a different viewing zone, or by displaying images intended to be viewed in different directions sequentially on the SLM and selecting which of the light sources is/are ON in correspondence with the displayed images such that each image is directed to its intended viewing zone).

This invention concerns high efficiency illuminators where the efficiency improvements are due to the fact that light is directed to viewers rather than spread in a wide viewing angle. To cope with the fact that there can be more than one viewer or that viewers can be in different directions, the illuminator is able to switch electronically the direction by which it concentrates light.

The 3M invention described above refers to an autostereoscopic screen with definite directions for the views. This display does offer switchable directional control but only two viewing zones are created in this arrangement and that the viewing directions are not widely separated in angle. It is not possible to increase the number using this invention as described. This would severely limit the amount of improvement of efficiency for one viewer and not at all for a second. The limited beam width would also cause severe image brightness variation with angle within the zone.

The Microsoft and RealD inventions described above propose use of a lightguide with a thickness that varies with distance from the light source in a tapered or stepped manner. The nature of the tapered or stepped construction implies that the thickness of the lightguide, at its thickest point, is significant if good uniformity and efficiency is required. Also as the collimation direction changes, the area by which the different zones appear uniform is significantly smaller than the size of the lightguide itself. Both of these features are undesirable in all sizes of displays, but especially in mobile and tablet sized systems where efficiency improvement is most significant.

This invention has the advantages of the citations in that the light sources are placed only on one edge of the lightguide and are switched electronically and that the illuminator is based on well-established lightguide technology.

This invention seeks to enable an illuminator that improves on the existing prior art by offering an illuminator that can produce multiple, preferably three or more, zones and do so without significantly increasing the thickness of the lightguide compared to prior illuminators or extending the lightguide outside the normal boundary other than with the LED mixing region.

This invention consists of the following component parts; an array of light sources (or groups of light sources), for example LEDs, that can be independently controlled or switched; a lightguide; extraction features of a novel design on one or more surfaces of the lightguide and a reflector sheet underneath the illuminator. The light sources are separated in space and are arranged along one side of the lightguide.

The light sources are positioned so that the cone of light emitted from each illuminates the active area of the lightguide directly. Each individual point on the active area of the lightguide is illuminated by each LED, but is illuminated from different angles by different LEDs. The extraction feature at that location may have its shape and orientation chosen such that light at each incidence angle (ie, from each LED) is extracted from the waveguide along different directions in space. Another location on the lightguide, in order to extract light in the same set of directions, may have an extraction feature of a different shape and/or orientation in order to do this.

The set of shapes is then patterned over the area of the lightguide in order to achieve two aims—firstly that one light source creates a central zone (where this is desired). Secondly the shapes create a uniform appearance to the illuminator in all of the zones chosen.

One possible set of shapes for the extraction features are segments of an asymmetric elliptical cone. The cone is truncated with a flat top and the cross section is an asymmetric ellipse, where the eccentricity and asymmetric varies across the surface of the lightguide.

The cones are patterned such that the eccentricity increases further from the light sources (circular near the light sources) and the asymmetry varies to the left and right of the central line of the lightguide. The orientation of the asymmetry is such that the prime axis is towards the light source that forms the central viewing zone.

This invention is not limited to such cones as extraction features.

Another possible set of extraction features are similar cones but with an asymmetric hexagonal shape with a similar pattern to that of the elliptical cones.

A turning prism film can be used depending on the extraction features.

A diffuser can be used to improve the visual uniformity.

The illuminator can be a backlight for a spatial light modulator as a display, for example with a liquid crystal display.

The invention can be used with only two zones for sequential autostereoscopic viewing.

The invention can also be used for tracking a sequential autostereoscopic illuminator with two zones that can be moved in direction also.

The invention can also be used for tracked autostereoscopic illumination for multiple viewers.

The invention is not limited to flat or uniform illuminators. There are sets of shapes that can be chosen to create zones from a curved illumination system or produce a specific non-uniformity on the illuminator. This may be used for a brand name or advertisement on a luminaire, for example.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DESCRIPTION OF EMBODIMENTS

Figure 1:
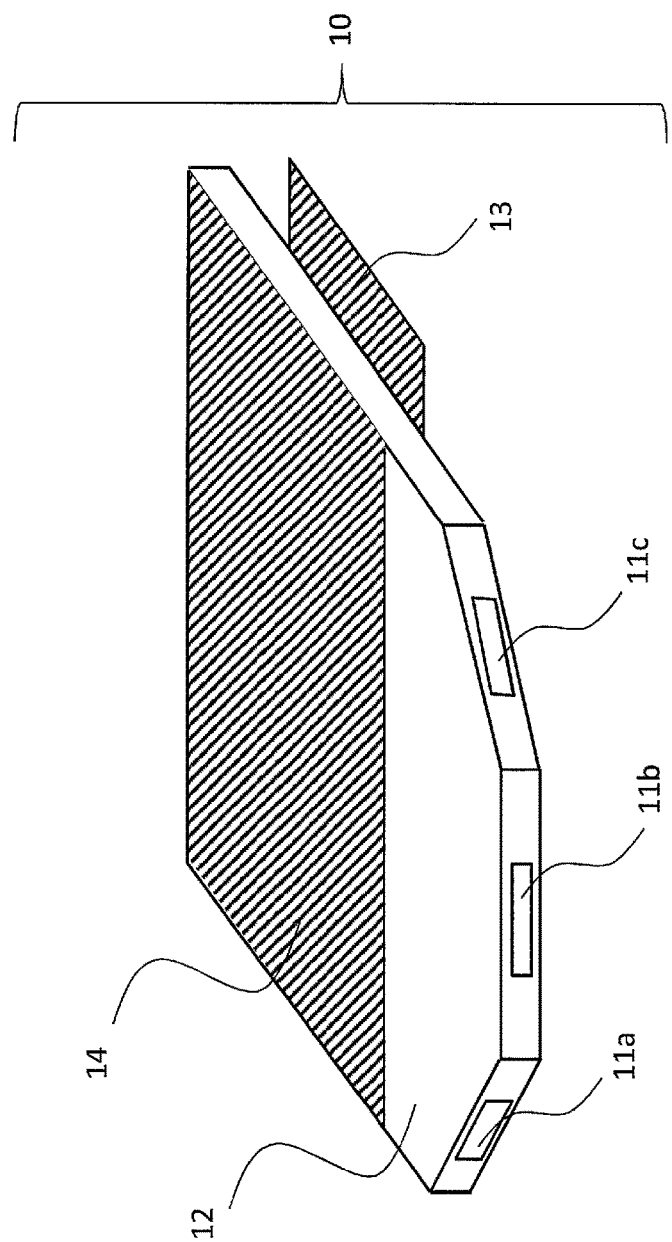
FIG. 1 A preferred embodiment of this invention

The first (prime) embodiment of this invention is described in the coming paragraphs and is shown in FIG. 1. This embodiment 10 consists of the following elements: An array of two or more light sources 11a, 11b, 11c, that are localized and are positioned along the input side of a lightguide 12. The input side is a thin edge of an area lightguide and can be the long or short edge. There is a reflective film 13 underneath one of the larger faces of the lightguide. The lightguide on one or more of the large area faces has extraction features 14.

The light sources could be LEDs or groups of LEDs.

The input face of the lightguide may have in-coupling features to aid the in-coupling or control the angle of the light spread in the lightguide. These features are not important for the operation of the invention. Additional mechanical structure for mounting is possible but not included in this description as it has no bearing on the operation of the invention.

The invention enables a lower power requirement for a given brightness seen by a viewer. It does this by directing light from each light source into a given direction or zone that is different to, and preferably non-overlapping with, the directions or zones into which light from other lights sources are directed. When all light sources are on, the illuminator looks like any typical backlight. Each light source however contributes the same brightness in a particular direction and a viewer in that direction will see the illuminator as before whenever the light source that illuminates that direction or zone is on, regardless of whether the other lights sources are on or off. In the case where only zone is required to be illuminated most of the light sources may be turned off, this saving power and introducing a significant saving in power usage and corresponding improvement in efficiency and lifetime.

Figure 2A:
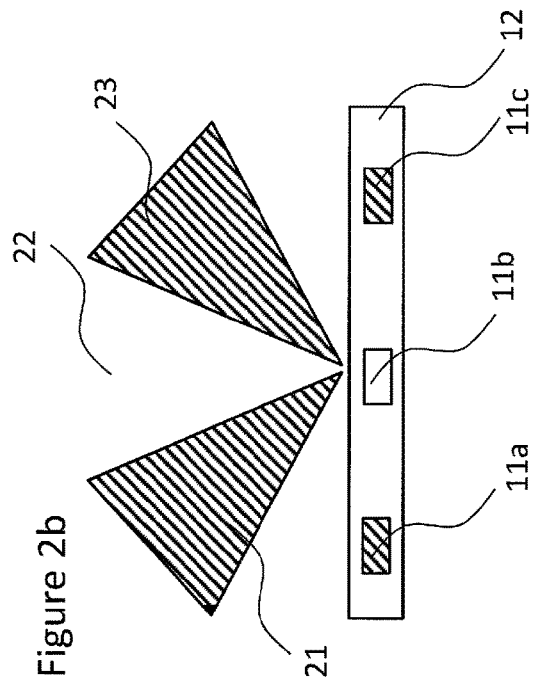
FIG. 2 Illustration of a flat illuminator operable to illuminate different zones FIG. 3 Arrangement of the light sources to illuminate the active area FIG. 4 Definition of a central axis FIG. 5 Definition of the zone response function FIG. 6 Definition of the extraction zone response function FIG. 7 Incident angle at the far end of the lightguide FIG. 8 Incident angle and ZRF at the near end of the lightguide FIG. 9 Determining uniformity from EERF FIG. 10 Non uniformity due to differing path lengths FIG. 11 Changing EEZRF while maintain EERF FIG. 12 Turning film for the preferred embodiment FIG. 13 Corresponding extraction features for the turning film FIG. 14 Simulation of ZRF for 20 degree incident for different shapes FIG. 15 Positioning of light sources FIG. 16 variation in shape of extraction features as a function of position FIG. 17 Simulation showing zone distributions FIG. 18 Arrangement for more than three zones FIG. 19 Illustration of an even number of sources FIG. 20 Use as a backlight FIG. 21 Use as an autostereoscopic display FIG. 22 Use as a display for multiple viewers FIG. 23 Use of a diffuser FIG. 24 Use of structure to increase zone separation FIG. 25 Use of hexagonal extraction features FIG. 26 Use as a luminaire FIG. 27 An alternative shape of extraction features FIG. 28 Altitude and Azimuth definitions.
Figure 2B:
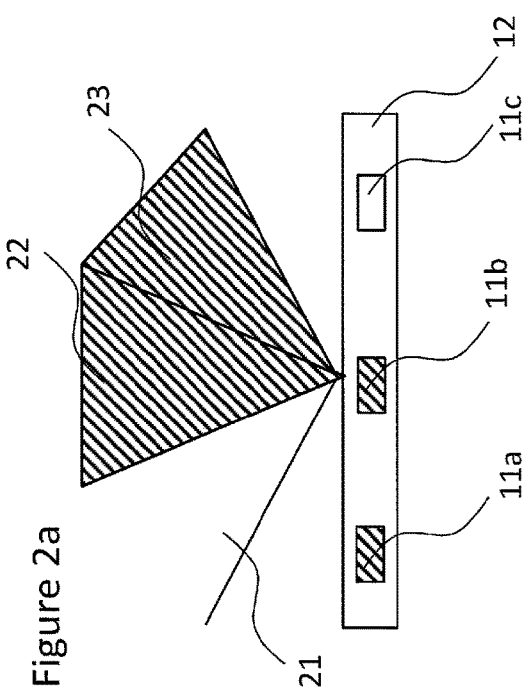
Figure 2C:
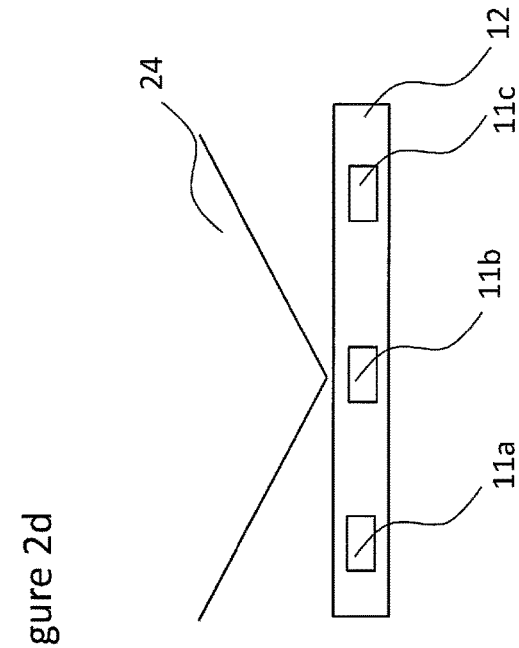
Figure 2D:
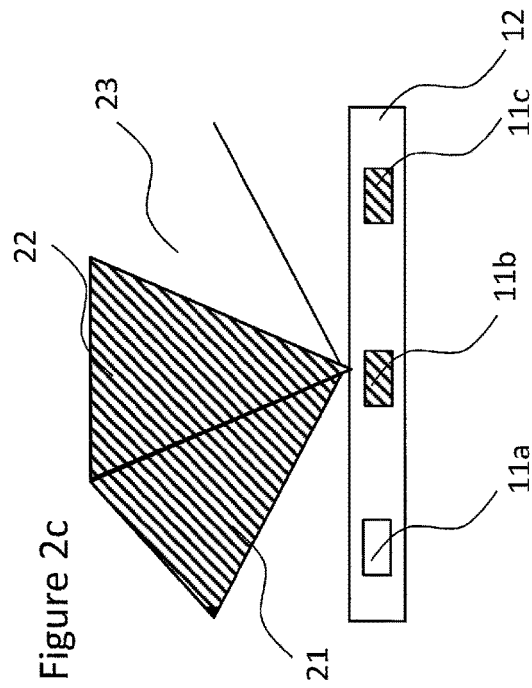

This is illustrated in FIG. 2a where the light source 11c is on and the other two sources are off. The light is then sent into the viewing zone 21. Similarly for the other light sources 11a and 11b are shown into zones 23 and 22 respectively in FIGS. 2b and 2c. FIG. 2d shows the operation with all of the light sources on creating a single viewing window 24. An observer in zone 23 will experience substantially the same level of illumination when all light sources are on (FIG. 2d) as when only the light source 11a that illuminates zone 23 is on (FIG. 2c), since the other light sources do not significantly illuminate zone 23 when they are on. Other combinations of light sources and the corresponding zones are possible.

In order to do this it is necessary to ensure that the brightness and also the uniformity of the illuminator are maintained in all of the zones associated with this invention. This is done by an appropriate choice of the extraction features.

Figure 3:
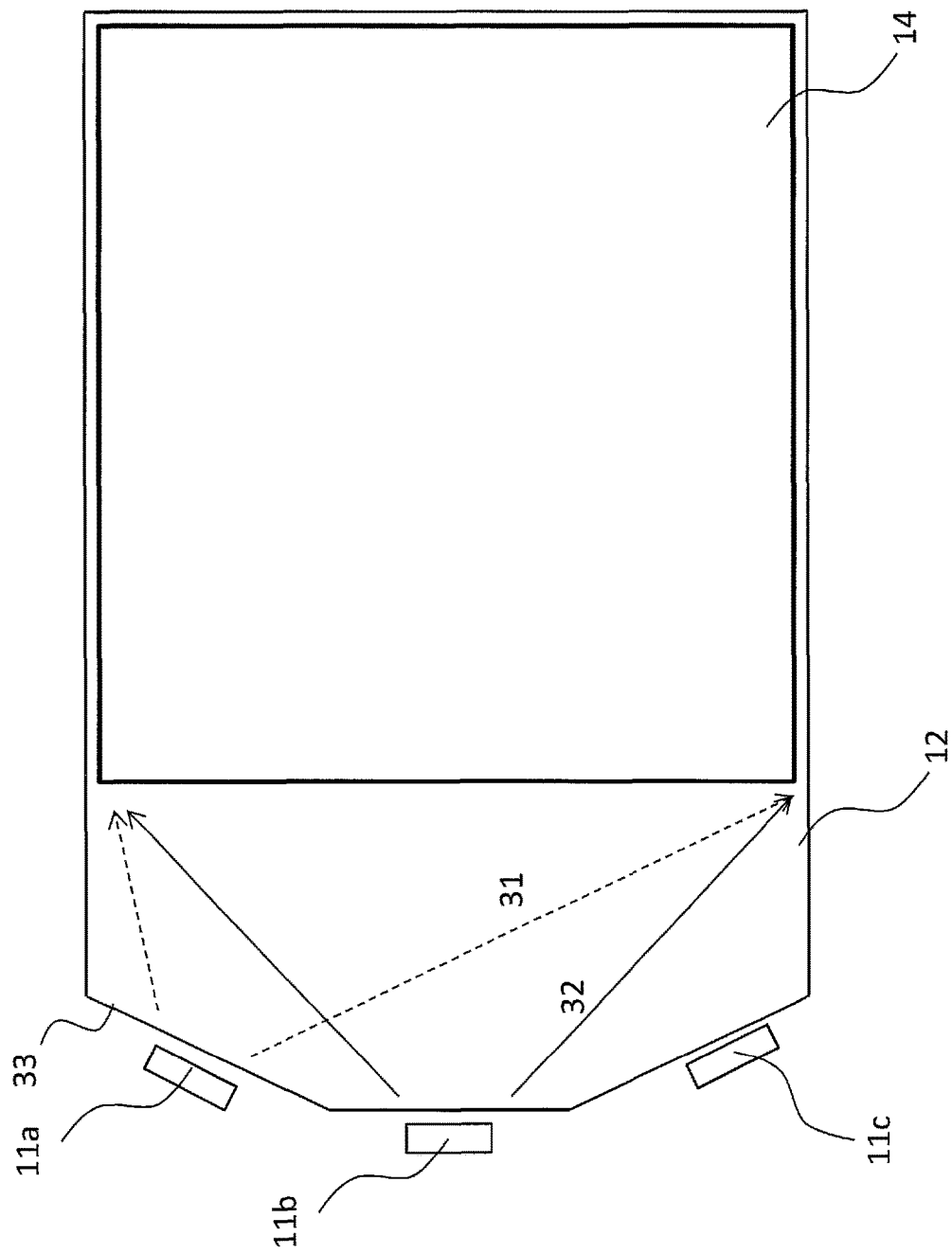

The light sources are positioned on the input face of the lightguide so that the light from each spreads across the active area of the lightguide. This is shown in FIG. 3. Light source 11b is positioned centrally and emits light 32 such as to illuminate the whole of the active area 14. Similarly for the light 31 emitted from the source 11a. The angle of the side 33a and the light source 11a is tilted towards the center so as to illuminate all areas of the active area. A symmetric arrangement is assumed for light source 11c (which, when on, also emits light such as to illuminate the whole of the active area 14).

Figure 4:
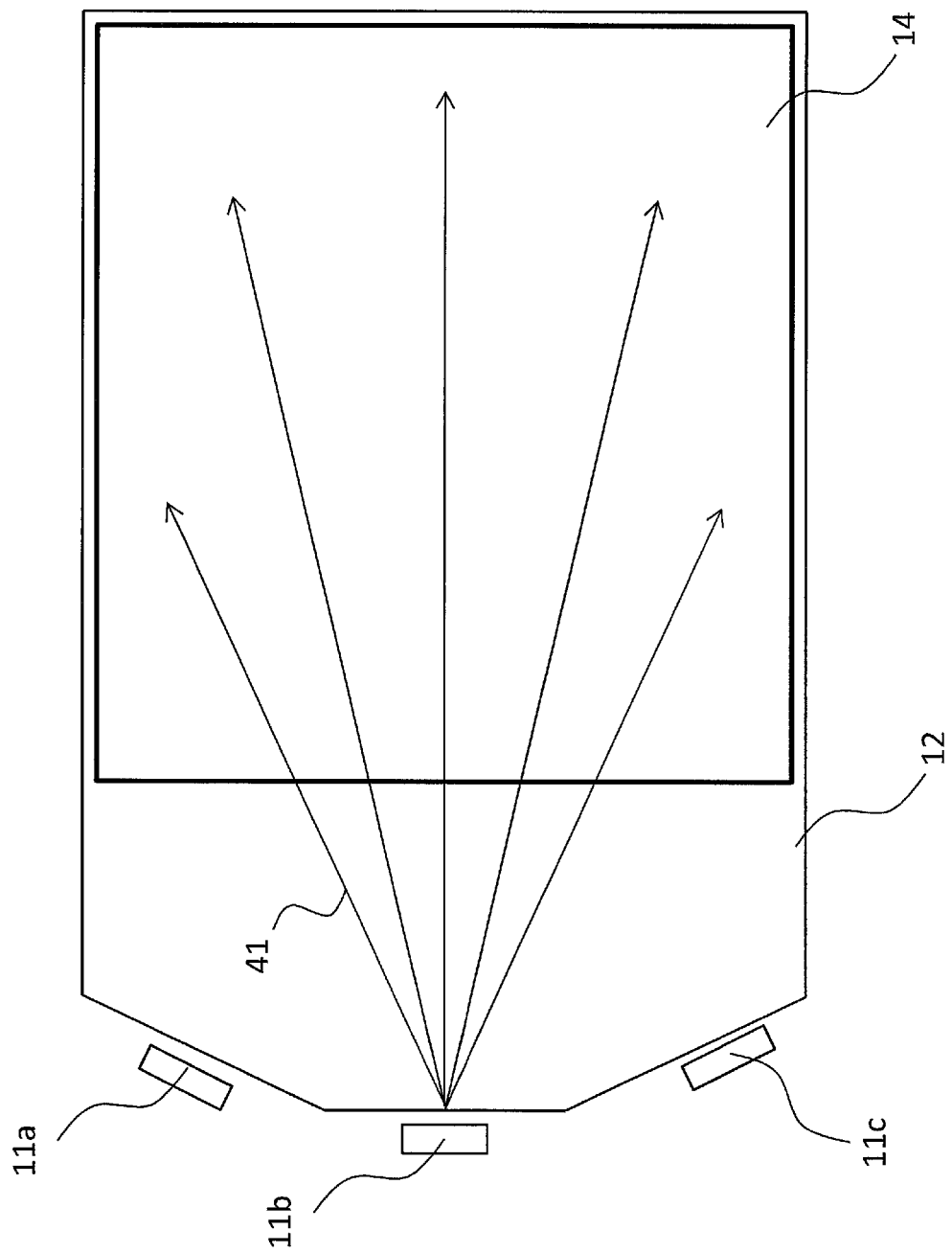

One light source, 11b, in this case the central light source, is chosen to act as the central zone source and in FIG. 4 defines a set of axial directions 41 which are radial and centered on this source. This light source thus acts as a "reference point" for the light extraction features, in that it a reference point used to define the set of axial directions 41.

For simplicity the invention will initially be described with respect to embodiments in which the light extraction features have a common reference point. As described with reference to FIG. 33 below the invention is not however limited to this and the light extraction features may alternatively be provided in sets of light extraction features with each set of light extraction features having a respective reference point, In such an embodiment a separate set of axial directions is defined for each set of light extractions features, with a set of light extractions features having an associated set of axial directions defined using the respective reference point for that set of light extractions features.

Figure 5:
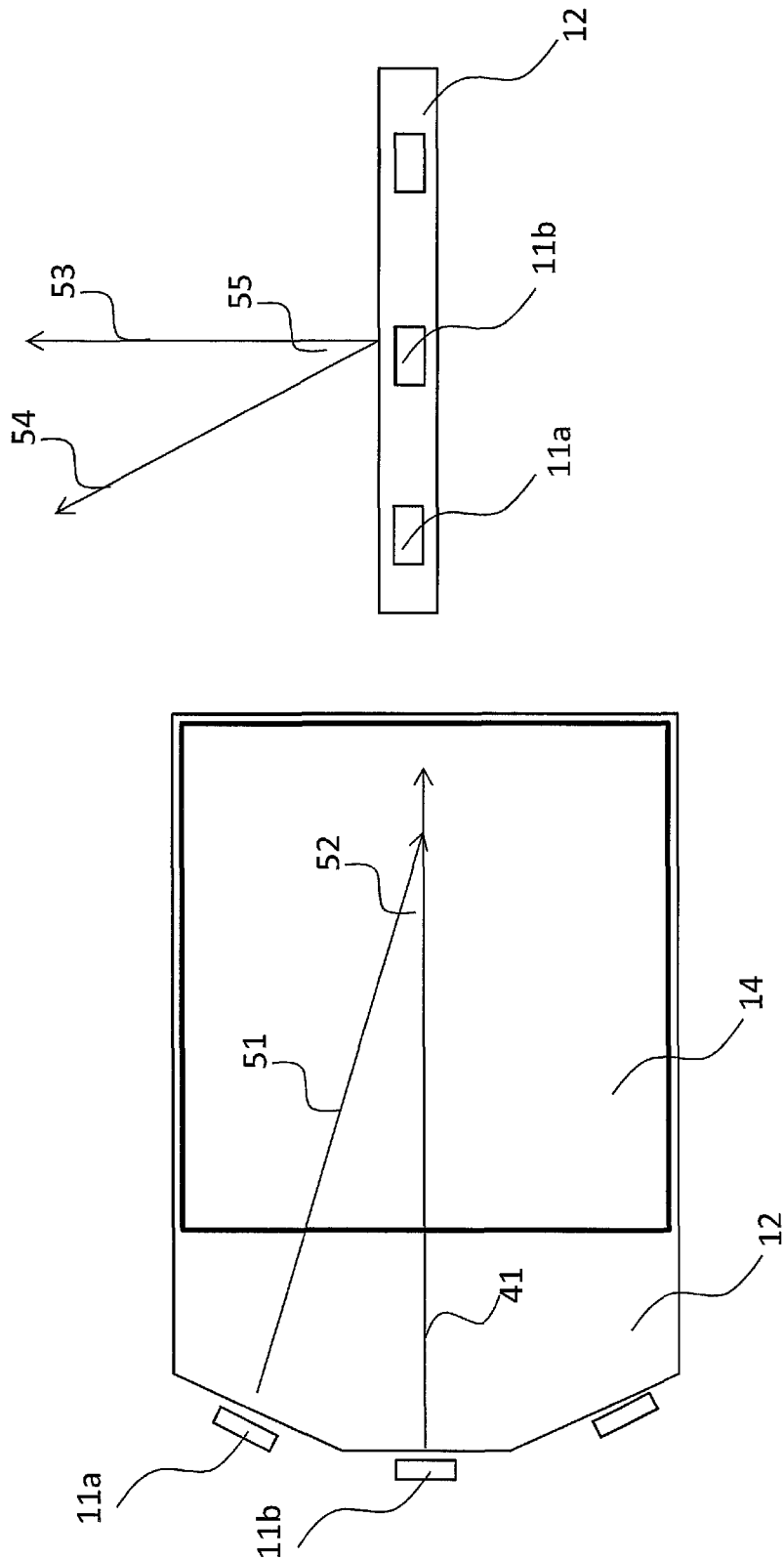

Light from another light source 51 then form an angle relative to this axis at each point on the lightguide 52. An extraction feature at this location would interact with this light (and any turning or subsequent films above the lightguide) to send it in a direction dependent on this angle 54 (FIG. 5). For a given extraction feature shape a function can be defined which relates the angle that the extracted light 51 from the light source makes to the axis 41 with the angle 55 that the light exits from the lightguide 54 relative to axial light emerges from the lightguide 53. This function will henceforth be called the zone response function (ZRF). This function will determine the zone separation as formed from the individual LEDs.

For a given extraction feature shape, the extraction efficiency can also be defined as the light extracted per unit area of the lightguide as a fraction of the light density in the lightguide at that point. In general this is also dependent on the angle 52 that the light from the LED makes to the axis 41 with the angle that the light exits from the lightguide relative to axial light emerges from the lightguide. This function is henceforth called the extraction efficiency response function (EERF).

Figure 6:
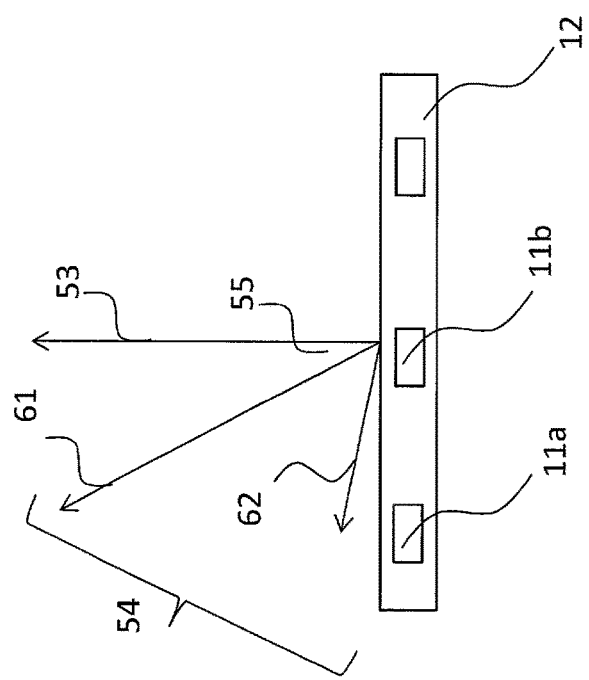

Further there is a function that can be defined which is the amount of light extracted from the lightguide only into the prime viewing zone 61, as a function of the internal angle as defined for the previous functions (FIG. 6) not taking into account light lost in other directions 62. This is the extraction efficiency zone response function (EEZRF). This function is also a function of the incident angle 52.

In order to create a lightguide that appears uniform with separate switchable viewing zones it is first necessary to determine the target zone separation and number of zones, which determine the number of light sources (or groups of light sources) to be used.

Figure 7:
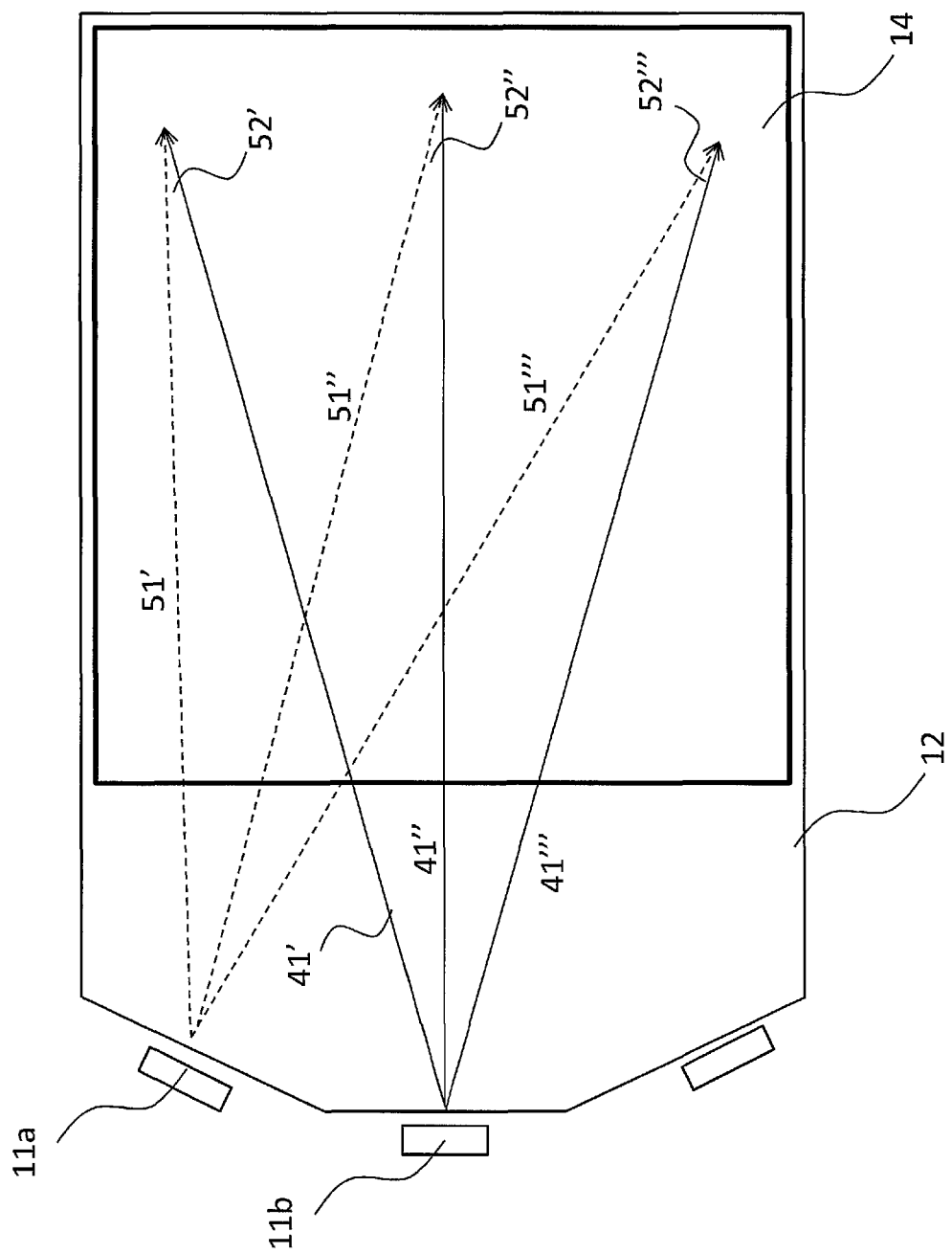

At the far end of the lightguide, the angle subtended (52', 52", 52''') between the light from the side light sources (51', 51", 51''') and the axis (41', 41", 41''') will be the lowest, and the change in angle between the axis and the light from the light sources as a function of position across the lightguide will be minimum (FIG. 7). In this case the shape of the extraction features must be chosen to have a high ZRF in order to define the required zone angular separation. It also will define the positions of the light sources in order to obtain the required zone separation at this location.

The extraction features will have a "preferred direction". As noted, light propagating within the lightguide that is incident on a light extraction feature along the preferred direction of the respective light extraction feature is extracted from the surface of the lightguide generally in a direction parallel to a reference plane that is crossed with the light extraction surface of the lightguide, for example is perpendicular to the light extraction surface. Light propagating within the lightguide that is incident on a light extraction feature along a direction that is not the preferred direction of the light extraction feature is extracted from the surface of the lightguide at a (generally non-zero) extraction angle to the reference plane. The extraction angle is related by a response function to an incidence angle between the light propagation direction and the preferred direction of the light extraction feature. The light extraction features are oriented such that the preferred direction of a light extraction feature is directed towards the reference point 11b—that is, the "preferred direction" of an extraction feature will be directed along one of the set of axial directions 41 (41',41", 41''') defined by the reference point 11b.

Figure 8:
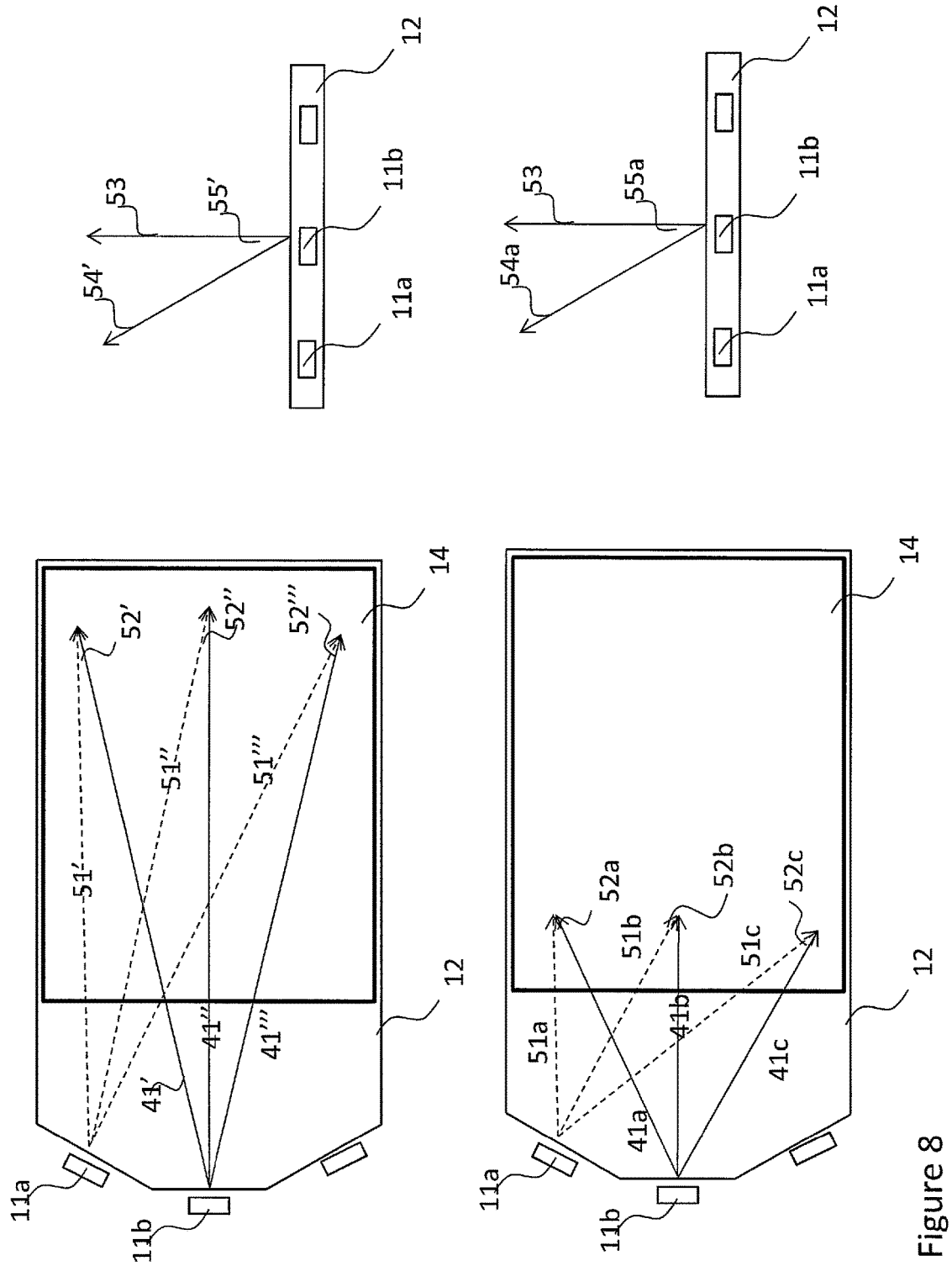

The shape of the extraction features are then modified moving towards the light sources so that the individual shapes are chosen so that the ZRF is increasingly weaker as the respective angles to the light sources are larger. That is, the response function increases with increasing distance of the light extraction features from the reference point, since the angle between light arriving at a light extraction feature from two different light sources decreases as the distance from the light source increases. The symmetry of the shapes may also change across the lightguide to compensate for the variation in the subtended angle from a single light source to the axis lines. This is illustrated in FIG. 8 where the angles 52', 52", 52''' are smaller than the corresponding angles 52a, 52b, 52c at extraction features nearer the light sources, whereas it is desired that the respective extraction angles 55' and 55a should be equal. Thus the ZRF for extraction features at the far end of the lightguide where the angles 52', 52", 52''' between light from the light sources and the axis are larger than the angles 52a, 52b, 52c for extraction features nearer the light sources (By a "larger" ZRF is meant that a given change in the angle 52, 52' etc., 52a etc. between the propagation direction of light incident on a light extraction feature and the preferred direction of that light extraction feature produces a greater change in the angle 55 between the direction 54 of extracted light and a reference plane defined by light 53 extracted as a result of light propagating along one of the axial lines 41.)

As the variation will be gradual across the lightguide, the variation in the shape of the extraction features will be such as to define a class of shapes that are gradually changing from the high ZRF to the low version.

The ZRF is generally determined by the three dimensional shape of the extraction feature, the slope of any sides and interaction with any films on the top surface.

Figure 9:
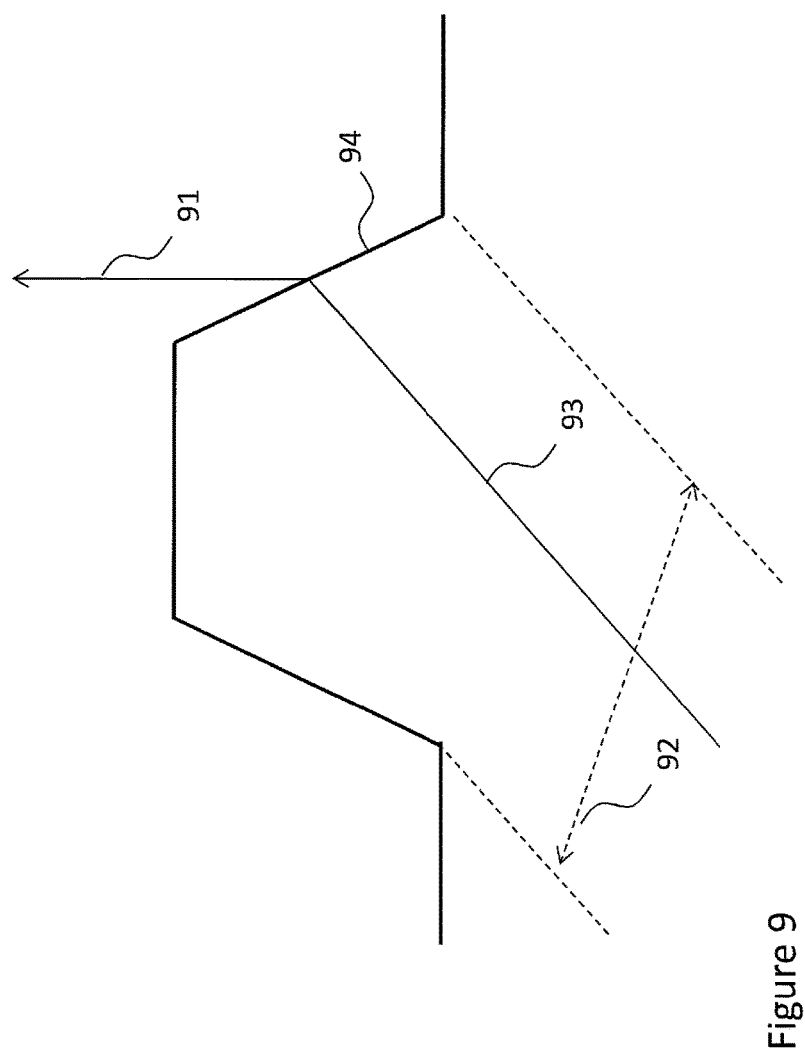

The EERF will generally be determined by the area at the lightguide surface of the light extraction features, and the shape of the extraction features is less important in determining the EERF. Hence the density of extraction features (that is the number of extraction features per unit area of lightguide surface) determines the extraction efficiency essentially independently of the feature shape. As shown in FIG. 9, incident light 93 onto an extraction feature light deviating edge 94 is deviated into a direction 91 within the appropriate zone. The slope 94 determines the direction whereas the projected area 92 determines the probability that light will be extracted by the feature. This can be optimized separately using known design tools in order to obtain an apparent uniform distribution in the central zone. This can be done because the area 92 determines the EERF, and the slope 94 and shape determine the ZRF in general.

In additional zones, as the distance passed through extracting areas is roughly equal and although it is not possible to fully correct, a high degree of uniformity can be obtained over most of the lightguide surfaces in all zones.

Figure 10:
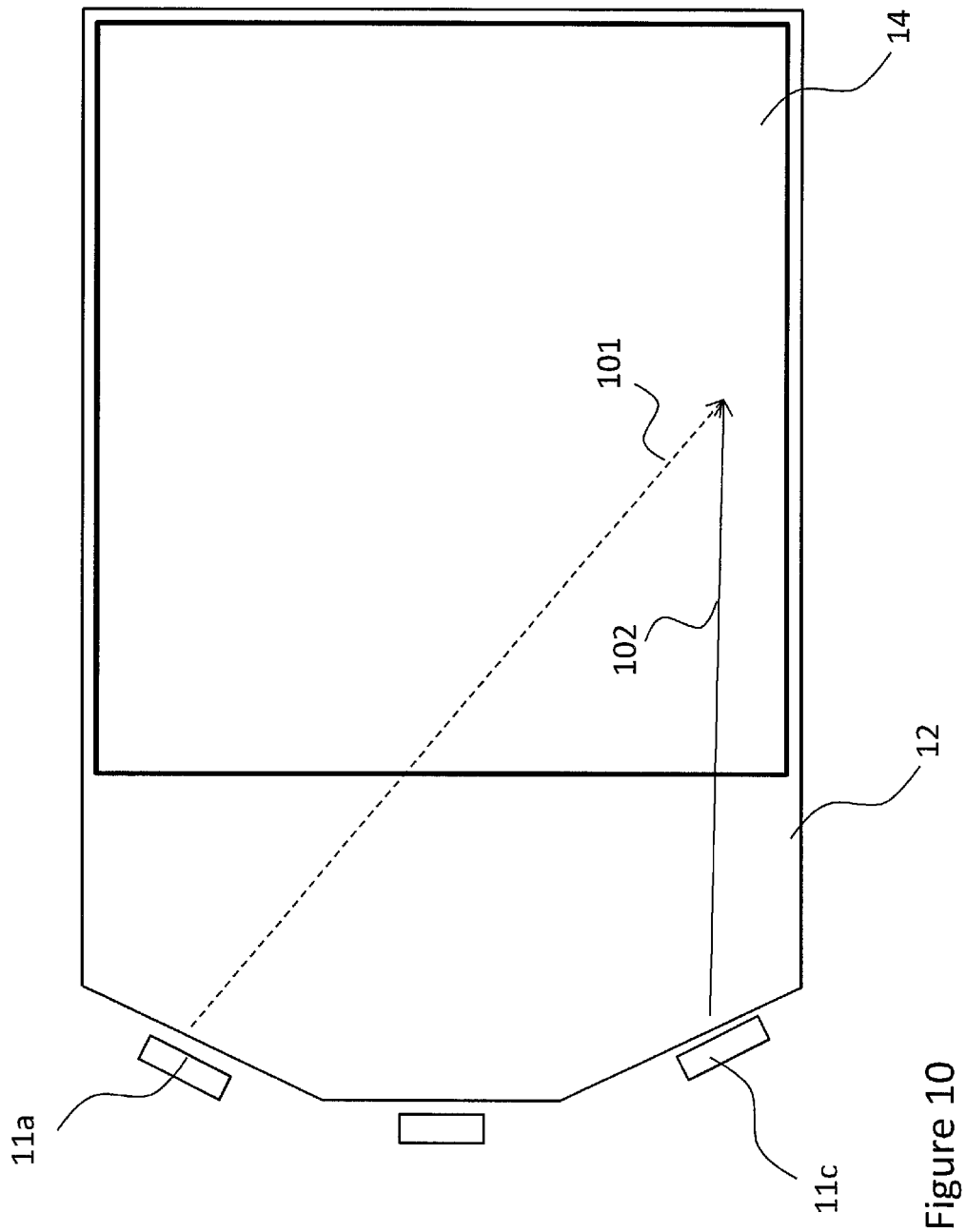

In wider and shorter lightguides, this assumption is less true as very different path lengths can be seen from different sources to the same point on the surface, thus a single extraction efficiency (EEZRF) would give significant non-uniformity in the lightguide. FIG. 10 illustrates this. Light 101 travelling from light source 11a has travelled further through the active area 14 when it reaches the point A than has light from light source 11c, so that the intensity of light from light source 11a propagating in the lightguide at point A will be less than the intensity of light from light source 11c propagating in the lightguide at point A (for the case of light sources of equal intensities to one another). If the extraction efficiency of the light extraction features is constant for all directions of propagation in the lightguide, such variations in intensity with propagation direction in the lightguide would cause light extracted from the lightguide also to show variations in intensity with direction.

Generally a lower brightness at the edges of lightguides is tolerated by viewers, however in general it is preferable to have some correction for this.

Figure 11:
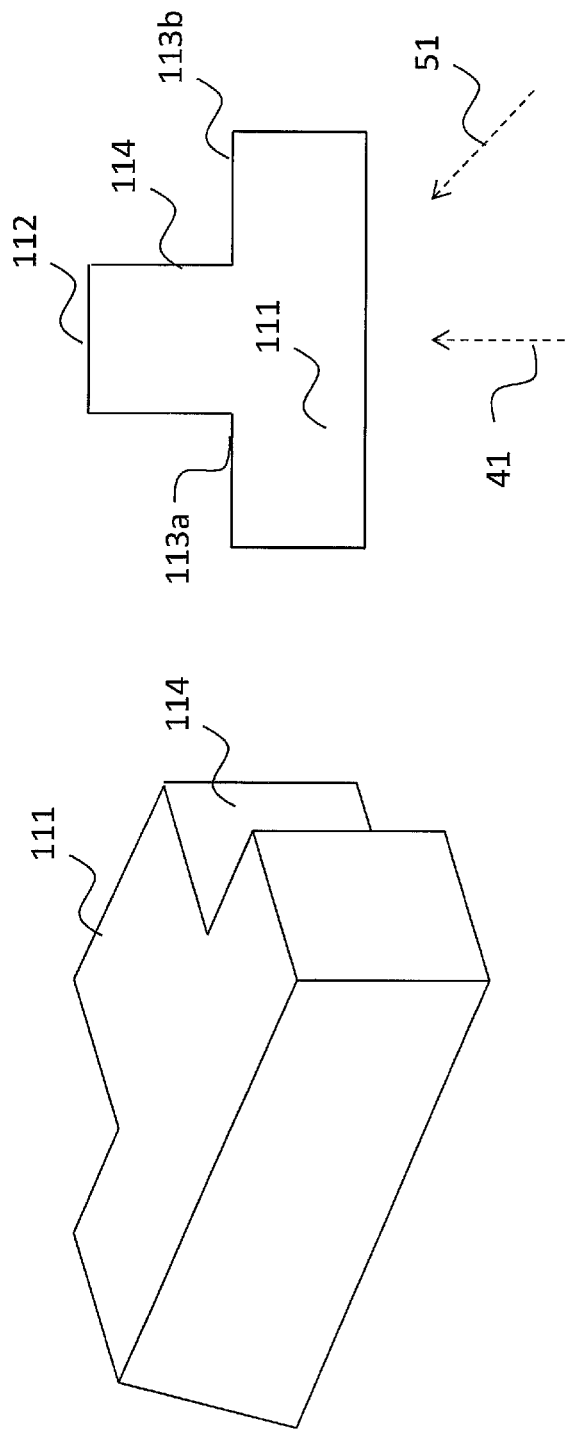

One method for this is to alter the shape of the extraction feature so that some sides are visible to the majority of light from one direction and not from others. This would not change the value of EERF to a significant degree, but would change the EEZRF. This would be done in such a way that paths that pass further under the extraction features (and hence have lower light density) would meet extraction features that have a better EEZRF at that incident angle than those directions that have a shorter path under the extraction features (and hence have higher light density in the lightguide). This is illustrated in FIG. 11 where a T-shaped extraction feature is used with the long axis of the feature away from the light source 11b (along an axial direction 41). On axis light 41 is extracted mainly by surfaces 112, 113a and 113b. Off axis light from a different source 51 will see more of surface 114, which directs light away from the main zone for that angle. Thus the EEZRF changes differently from the EERF, which for both 41 and 51 is determined by the footprint area of the T shape. An extraction feature having a shape such that some sides of the light extraction feature are visible to the majority of light from one direction and not from other directions, such as the T-shaped extraction feature of FIG. 11, may be used in any of the previously described embodiments.

This prime embodiment is summarized with reference to a particular example that can embody the main aspect of this embodiment and can be considered as the prime realization of this invention.

The features of this implementation (shown in FIG. 12a) involve a turning film 120 above the lightguide. FIG. 12b shows a top view showing that turning film 120 comprises lenticular symmetric triangular prisms 121. The lines of the lenticular prisms are in concentric circular arcs 122 defined by a centre at the central light source position 11b. FIG. 12c shows a cross section of the prisms along the radial line 122 and shows the prism shape with a top angle 123 of approximately 66°. The orientation of the sheet is such that the center of the concentric arcs is aligned with the light source. The pitch of the prisms need only be small enough to prevent Moire effects, 24 um would be considered sufficient.

The extraction feature shapes (shown in FIG. 13) are a class of truncated cones with an elliptical base. This ranges from a circular feature 130 to a highly elliptical feature 131. The angle between the slope side and the base 132 is 80°. The class of shapes is defined by a variation of the ellipticity of the base (as defined by an elliptical eccentricity or a stretch of a circle to differing degrees). The base area for the full class is maintained. The height and overall scale (size) is not important, other than being small enough to prevent Moire effects. A base area for the features similar to the area of a 10 um diameter circle and a height of 5 um for these features is generally sufficient.

These set of shapes can be defined as having an "expanding direction" 133 which increases in size relative to the "non-expanding direction" 134 with increasing distance from the central light source 11b. This can be by the physical increase in size of the extraction feature along the direction 133 or a contraction along the direction 134 or both. However, the extraction features do not increase in size along the direction 134 with increasing distance from the central light source 11b—with increasing distance from the central light source 11b, the extraction features may only decrease in size along the direction 134 or remain constant in size along the direction 134. Hence, the direction 134 is referred to as the "non-expanding direction".

The preferred direction of this set of extraction features is then parallel to the non-expanding direction 134. That is, the extraction features are oriented such that the non-expanding direction of an extraction feature is arranged along the axial direction 41a,41b,41c that passes through the location of the extraction feature. (In general the dimensions of the extraction features will be much smaller than the dimensions of the light sources so that the extraction features may be treated as point-like, but if this is not the case then the non-expanding direction of an extraction feature is preferably arranged along the axial direction that passes through the centre of the extraction feature.)

A symmetric arrangement of viewing zones is described in the prime embodiment. An odd number of viewing zones is also described with one viewing zone along the normal axis to the lightguide.

In this arrangement the centre of curvature of the prism zones is coincident with the central LED 11b.

Figure 13:
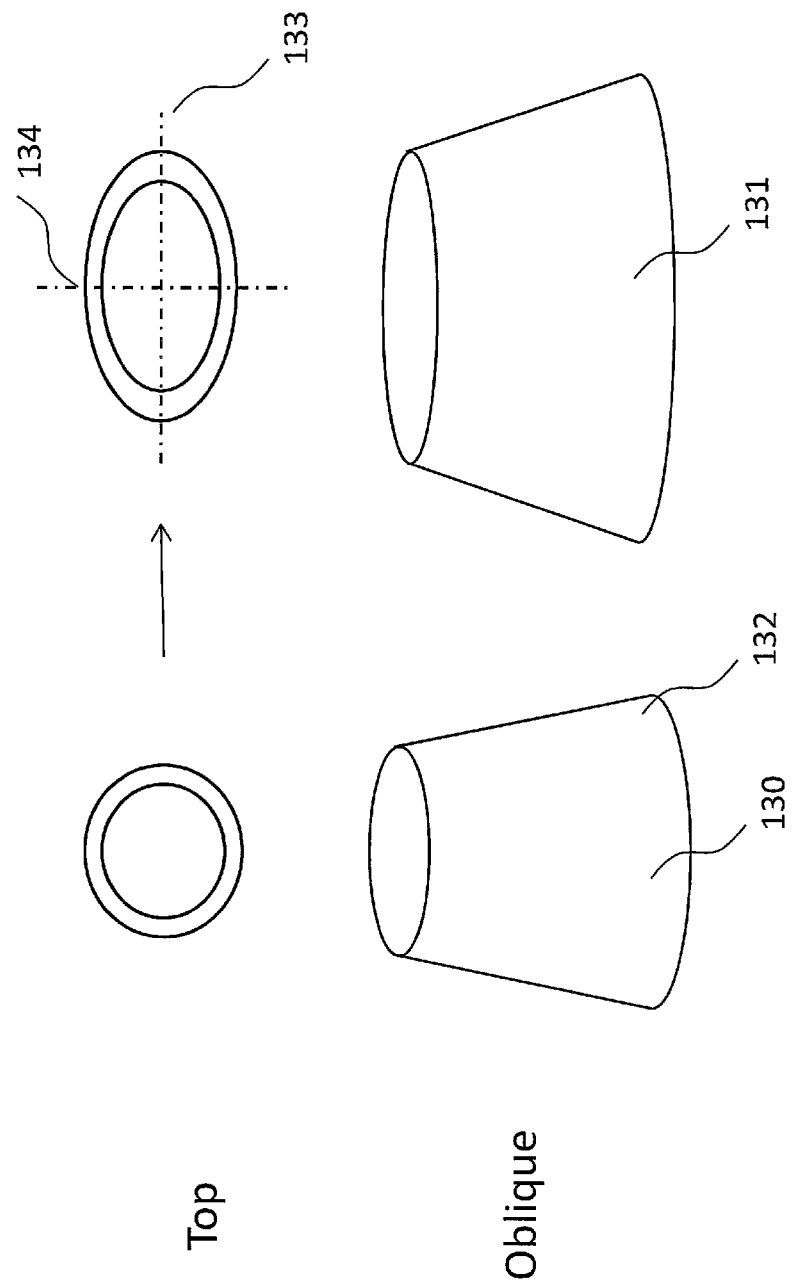
Figure 14:
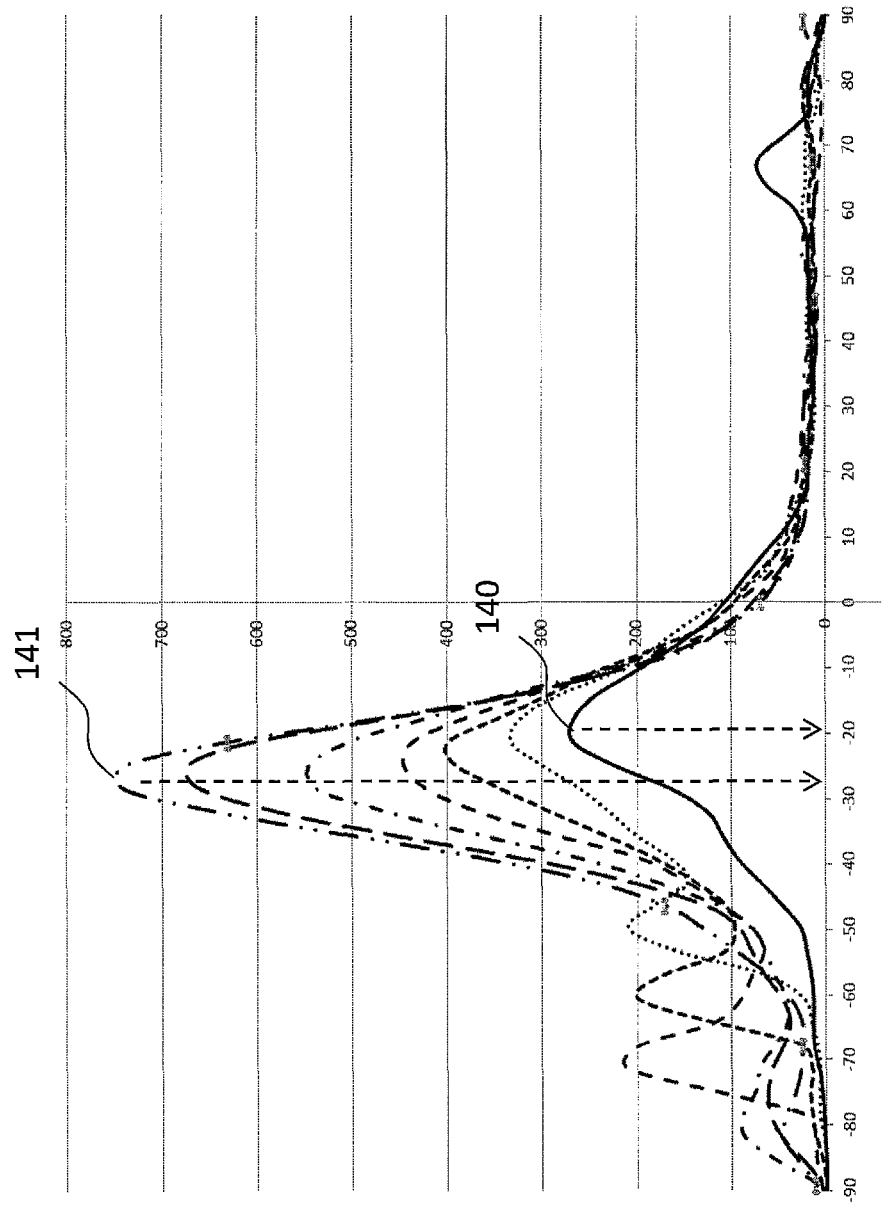

FIG. 14 shows the intensity of extracted light as a function of the extraction angle, and this indicates the zone angle, for a constant incident angle from one of the side light sources, for extraction features as shown in FIG. 13. The elliptical features are such that the minor axis is along the axial line to the central light source and the angle between the side light source is approximately 20°. Circular extraction features (trace 140) show a smaller ZRF at this angle than more elliptical features (trace 141). The increase in brightness is due to the increase in area for the elliptical features.

Figure 15:
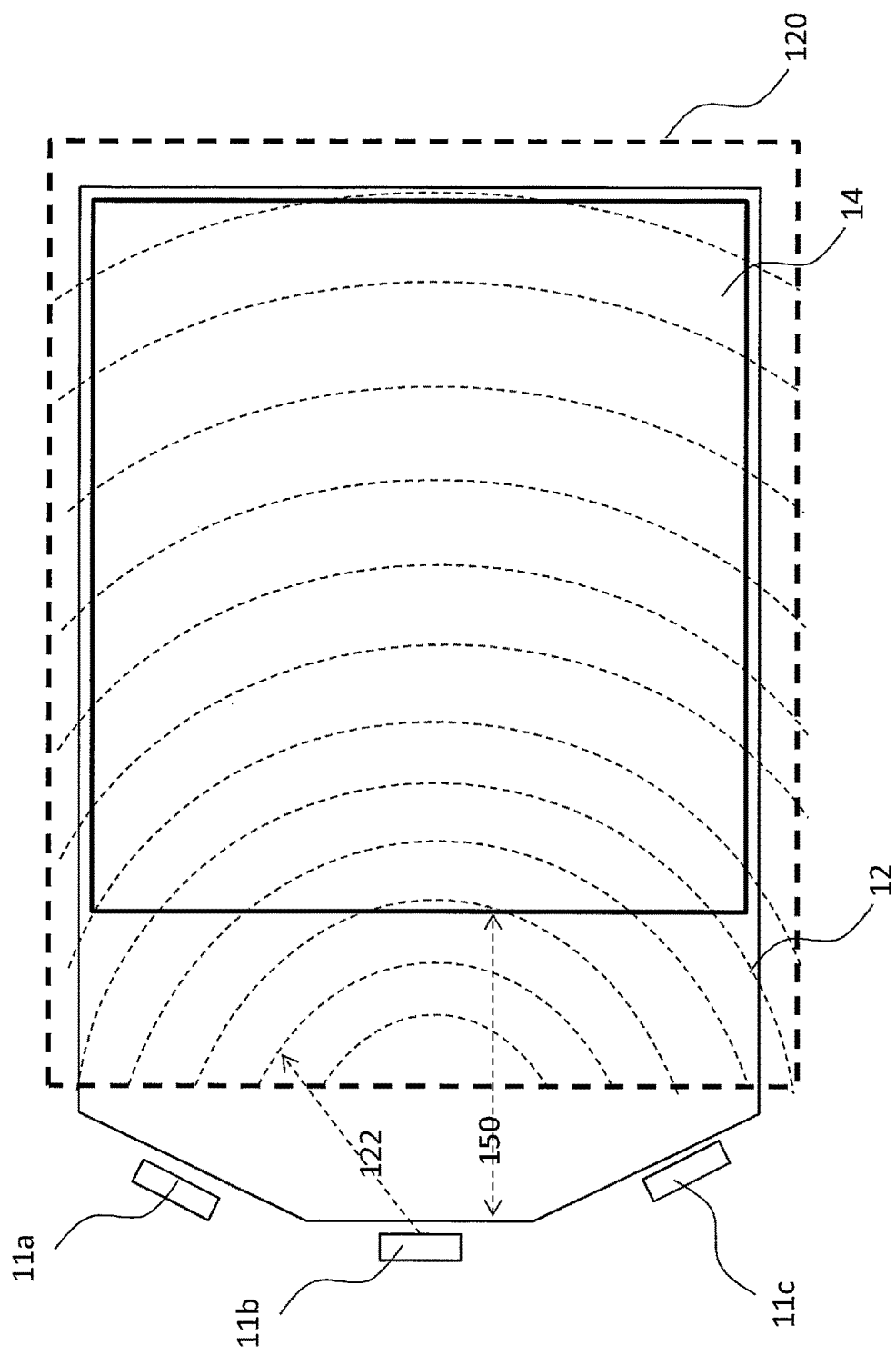

For a 36×48 mm emitting area, the central light source can be placed 18 mm from the short edge of the active area 150 and the two side sources positioned as shown in FIG. 15. The side sources are positioned 14.7 mm to the side, 15.4 mm from the active area at an angle of 20.1°.

Figure 16:
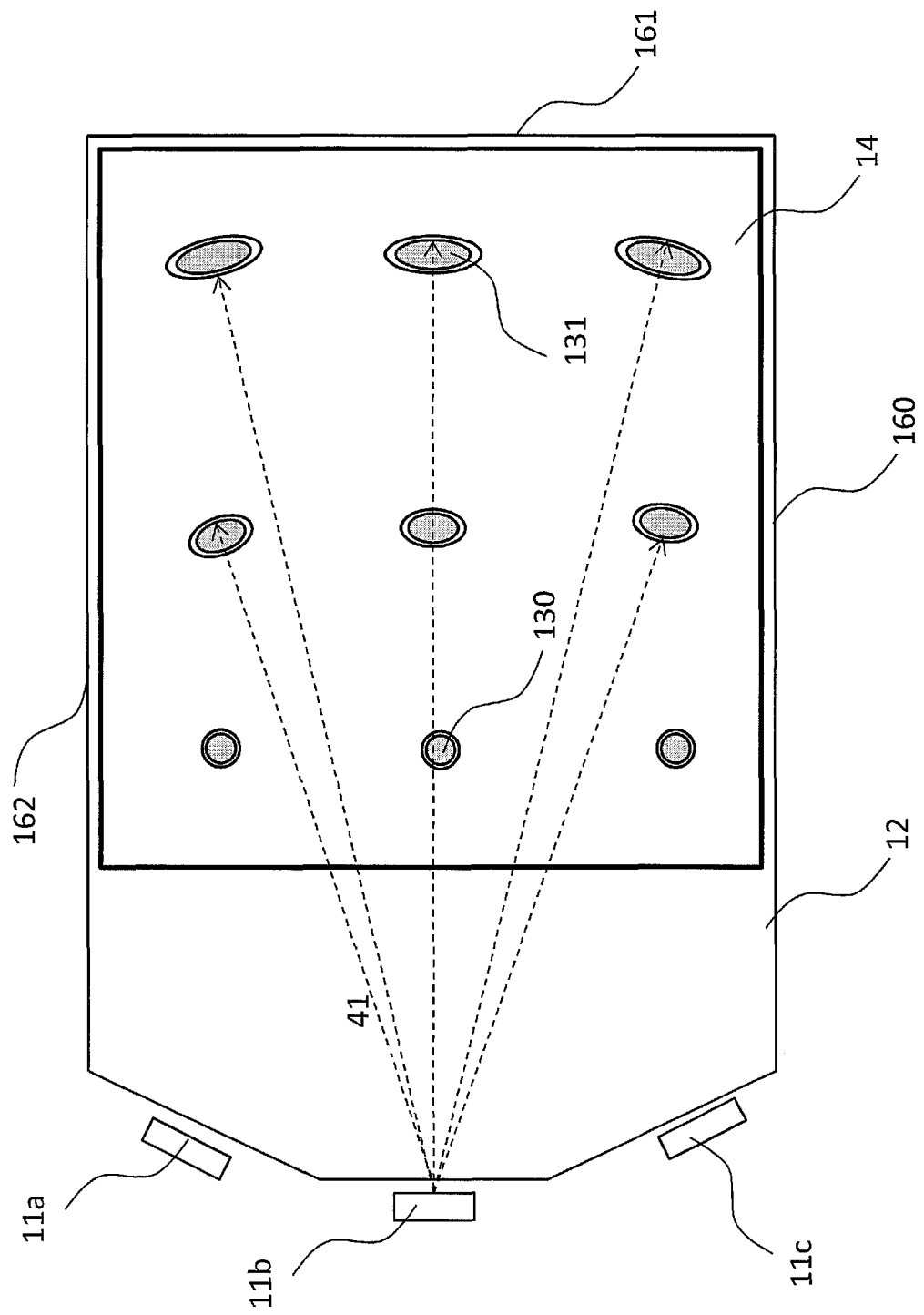

A pattern on the surface (FIG. 16, the turning film is not shown but understood to be present) where the circular features 130 are used close to the light sources and becoming more elliptical 131 far from the light sources. The features are placed on the top surface below the turning film. The position on one or both surfaces is possible in this geometry. The features are orientated so that the preferred directions 134 are in line with the axis 41 and the expanding directions 133 forming concentric circles also centered on the central LED 11b.

The edges 160, 161, 162 of the lightguide are preferably absorbing; to prevent crosstalk (light from one zone present in another) between zones, but this is not necessary, depending on the level of crosstalk required.

It is not required that the features be symmetric about the preferred direction. Extraction features to the left and right of the central axis may have asymmetry in order to improve uniformity of extracted light. This is because the side LEDs impact the extraction feature primarily on different faces and the curvature can be adjusted accordingly. Such extraction features are illustrated in FIG. 16a.

Figure 16A:
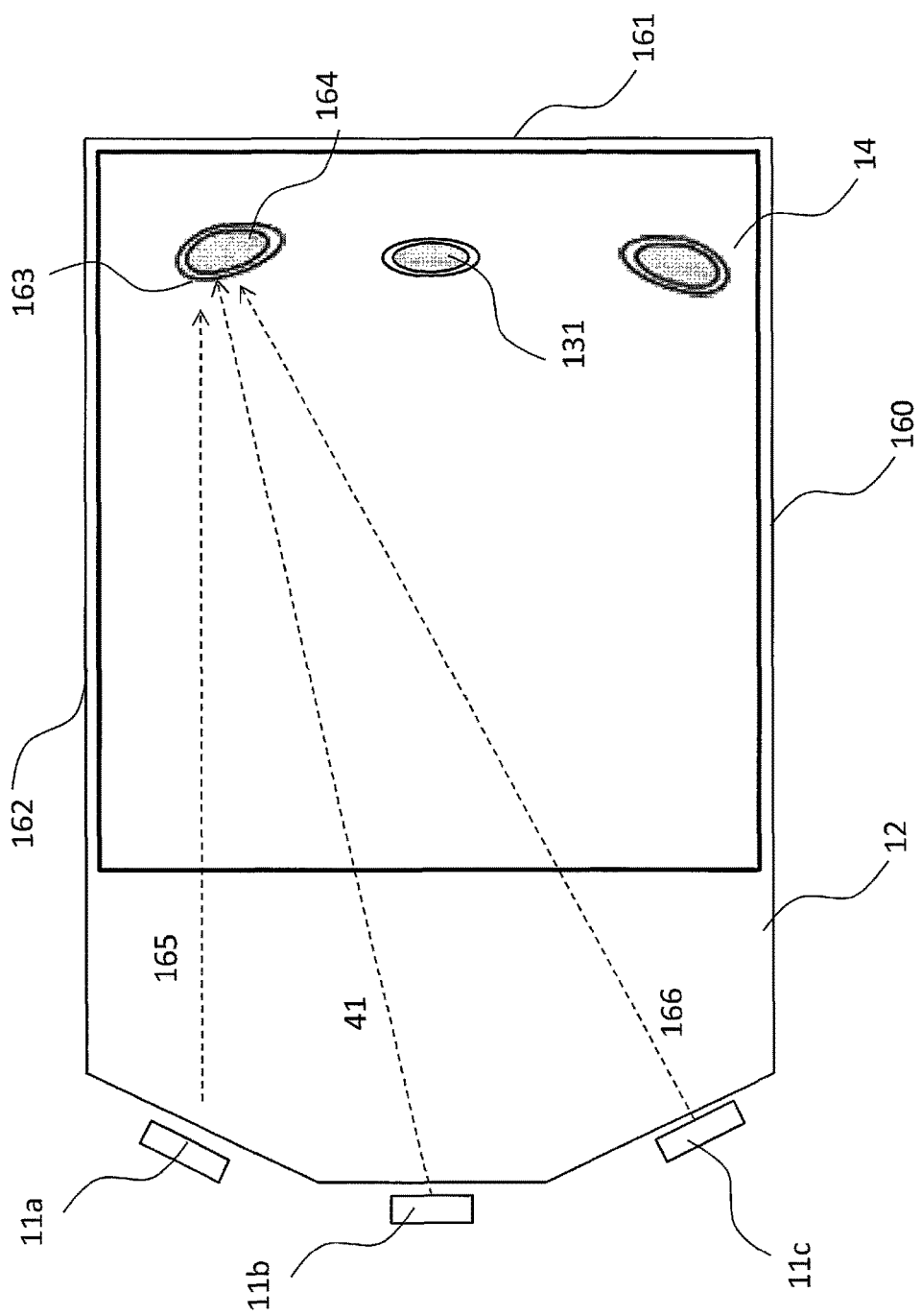

In FIG. 16a, the extraction features 131 have an asymmetry to compensate for the fact that the angles made between the axis 41 and the side LED axes 166 and 165 are not precisely equal. As the light from the LEDs predominantly hits opposing sides 163 and 164, these two sides can have differing curvature in order to optimize uniformity. The axis line where there is symmetry between the side LEDs will have no differing angles, and hence extraction features positioned on this axis line are preferably symmetric.

Figure 17:
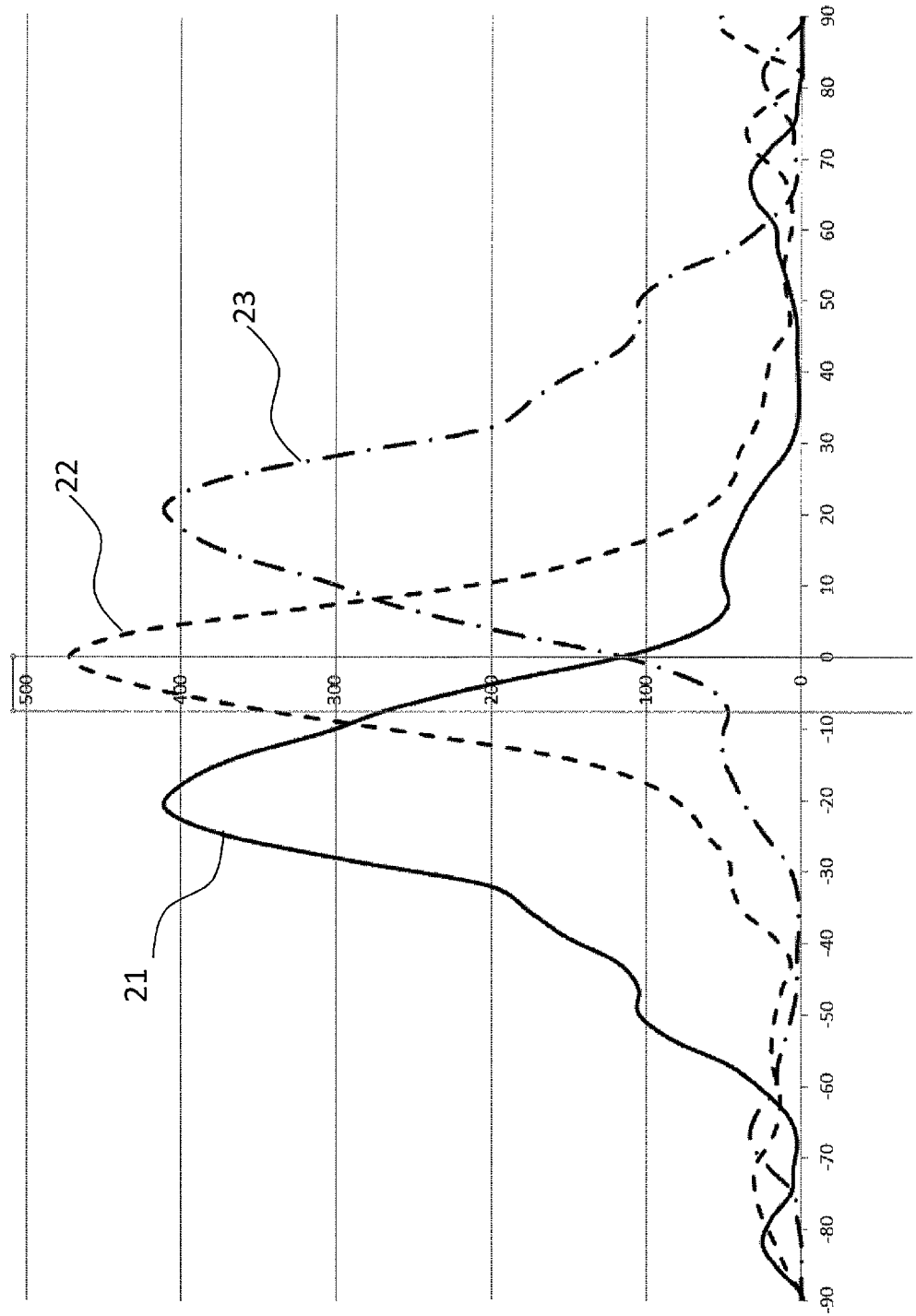

This will create three zones, roughly 20° wide separated by 20°. All zones 21, 22, 23 on would give a wide illumination, approximately 60° wide. (FIG. 17 shows the intensity of extracted light versus angle of extraction for the three zones.)

The ellipticity can be changed according to a known ZRF and the density can be changed using standard modelling software in order to achieve uniformity. In this configuration it is not necessary to create additional EEZRF correction.

This apparatus thus creates a zone structure for a low power display (where zones can be switched off to reduce power consumption and increase battery life) or for a sequential multi-view autostereoscopic display, where the zones are switched quickly with images on a display above the illuminator. In addition this invention also can be applied to a general illumination system, for example in a shop display or in entertainment venues, where directional controlled illumination is required. The apparent uniformity of the illuminator in this configuration would reduce eye glare for a given illumination (because of the large uniform light source). This would form a large uniform image on the eye retina rather than a point image from current spotlights, thus giving less glare for a given illumination.

Further the invention allows the use of lightguides and backlights with no additional optics on three sides of the lightguide, and of the same thickness as existing flat illuminators that do not have such zone properties.

Further embodiments are described in reference to this primary embodiment and it is understood that one or more of these embodiments can be used in the same apparatus and is covered by the scope of this patent. Only differences over the primary embodiment are described.

Figure 18:
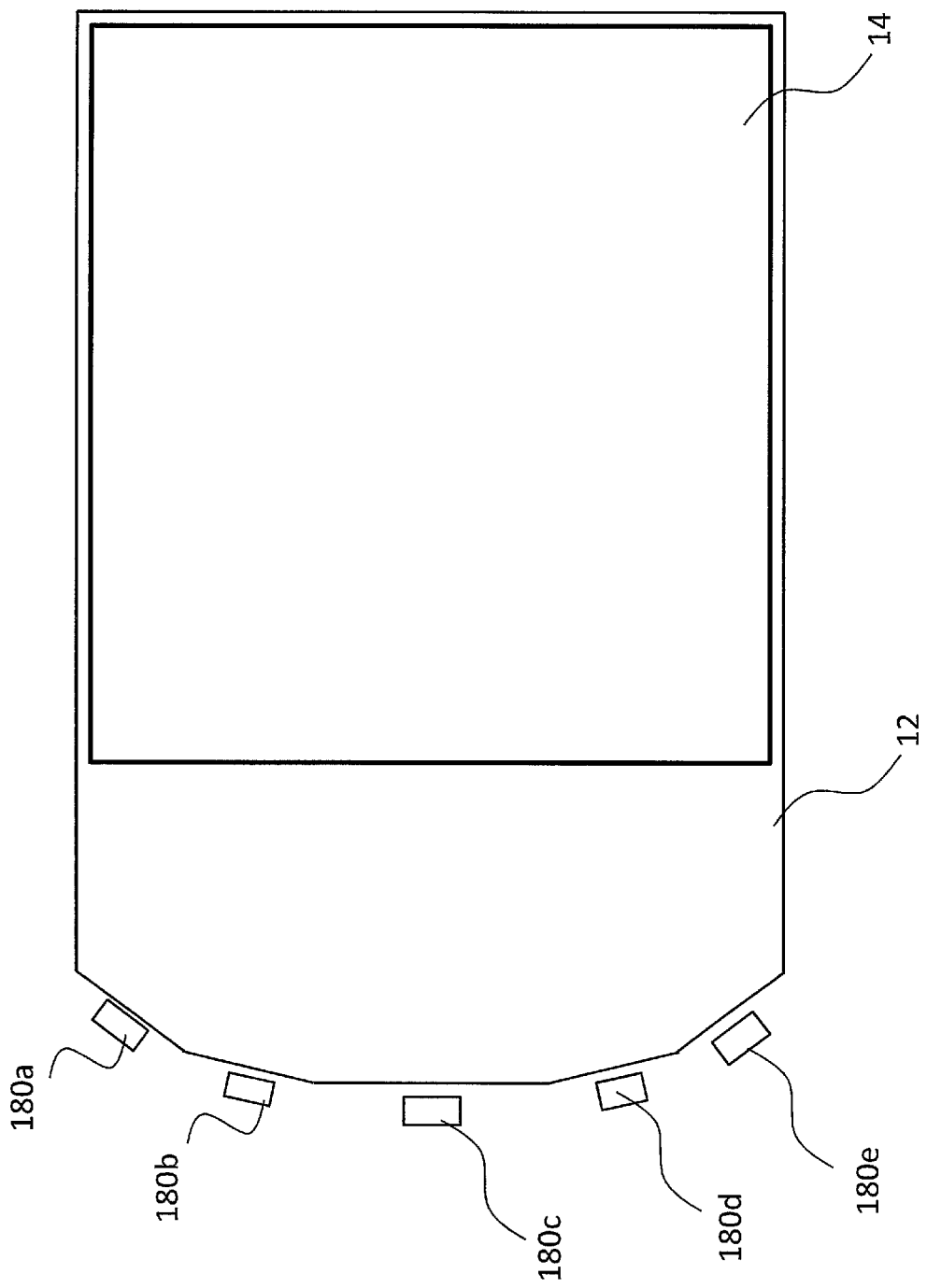

In a further embodiment, although three light sources are described above, it is understood that more light sources would imply more zones. FIG. 18 shows as an example and illumination system having five zones from light sources 180a, 180b, 180c, 180d, 180e. The zone angles would be dependent on the position of the light sources and the extraction features, along with subsidiary optics. This invention does not specify the size of the light sources themselves, though the invention does work better with smaller light sources relative to the spacing of the light sources along the edge.

Figure 19:
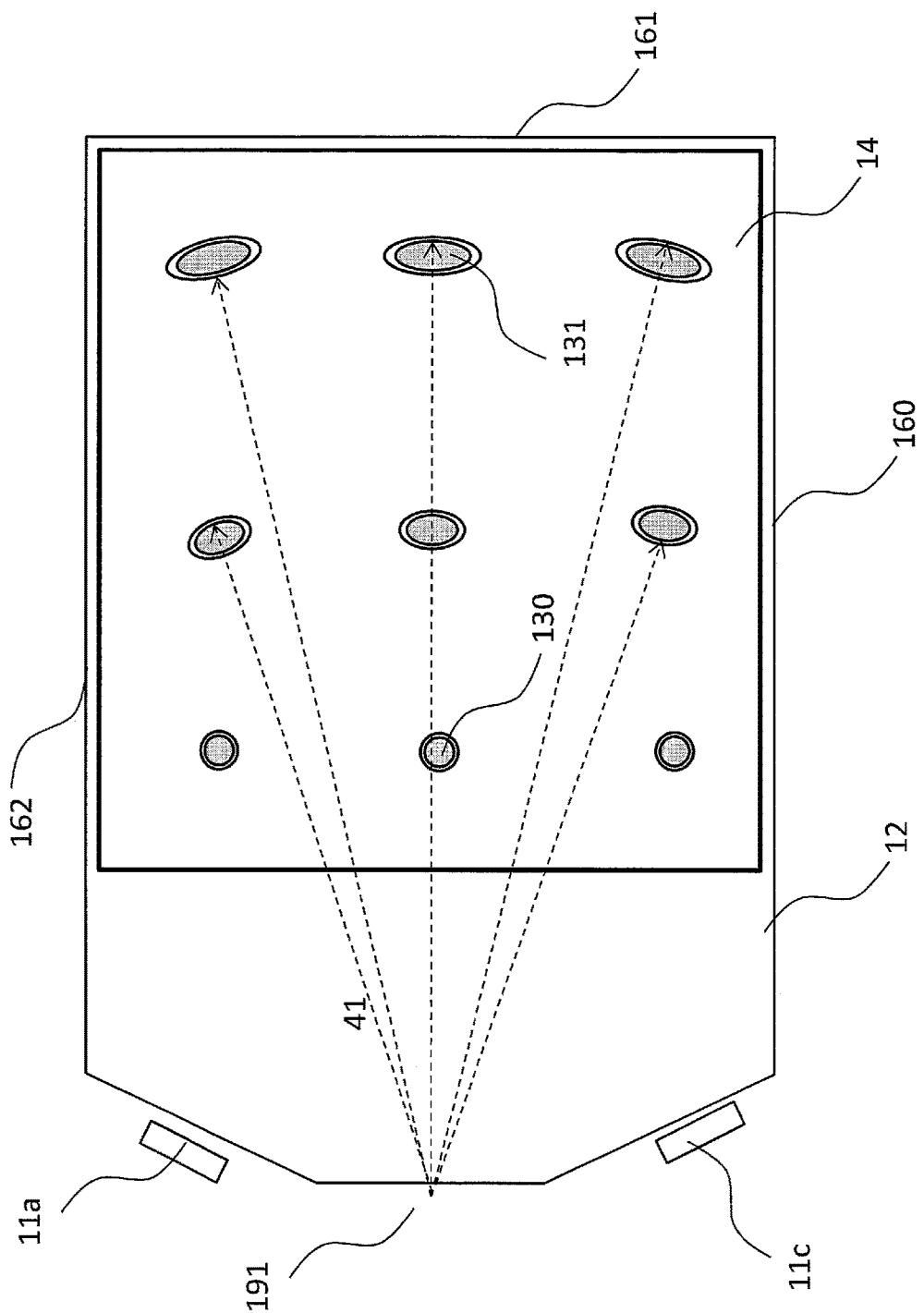

In a further embodiment illustrated in FIG. 19, an even number of light sources can be used. In FIG. 19 a symmetric arrangement of an even number (two, though more can be assumed) of light sources and other components are distributed in the same way, though there is no light source at the convergence point 191 of the prism structures and features and no central viewing zone is formed.

It is not required that the zones be symmetrical. Asymmetric spacing of the light sources is also possible. In the case of asymmetry, the centre of convergence 191 need not be along a symmetrical axis and there may be more light sources on one side than on another. In this case the centre of the preferred directions and the centre of the prisms would still be coincident and may also be coincident with a light source. However the center of symmetry of the curvature of the two sides of each extraction feature may not be also at this center and may be optimized for the asymmetric distribution of the light sources.

Figure 20:
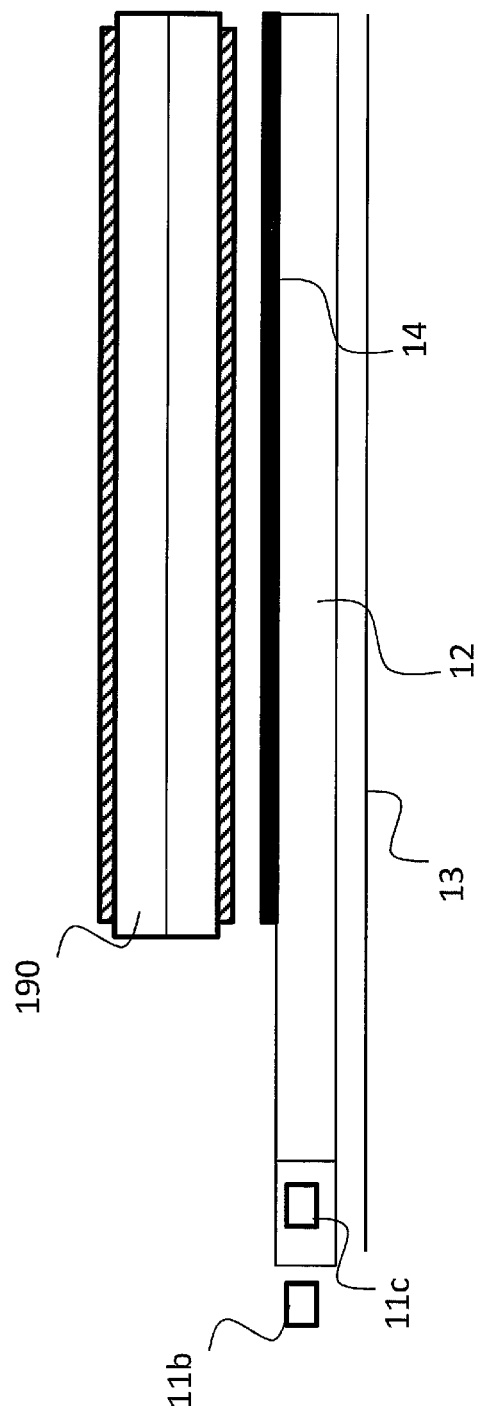

In a further embodiment shown in FIG. 20, this flat illuminator can be used with a spatial light modulator, SLM 190, (such as a liquid crystal panel) in order to form a display device. The display can be flat or curved and the light sources can be LEDs or laser sources (diodes or optical fiber driven sources). The turning film is also possible in this design as well as a diffuser.

In a further embodiment, the flat illuminator can be used with an SLM where the illustrated five zones can be switched to provide a display that can operate as a 2D display or as an autostereoscopic display. FIG. 21a shows the 2D mode with all the light sources on. The SLM 190 shows a normal 2D picture. FIGS. 21b and 21c show a switch between display of a left eye image 201L (FIG. 21b) created by having light source 180d only on so the viewer only sees, with their left eye, a left-eye image 200L displayed on the SLM and display of a right eye image (FIG. 21c) in which the viewer sees, with their right eye 201R, only a right eye image 200R displayed on the SLM when the light source 180b is on. 200L and 200R are a stereo pair of images creating 3D for the user.

Figure 21E:
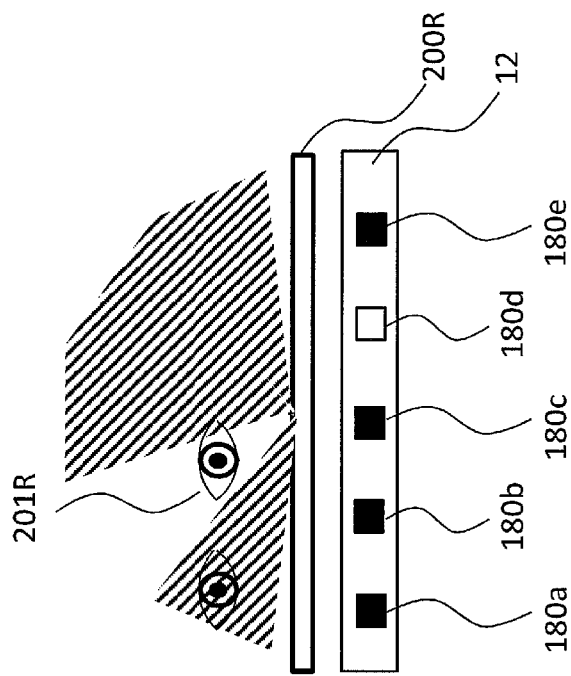
Figure 21D:
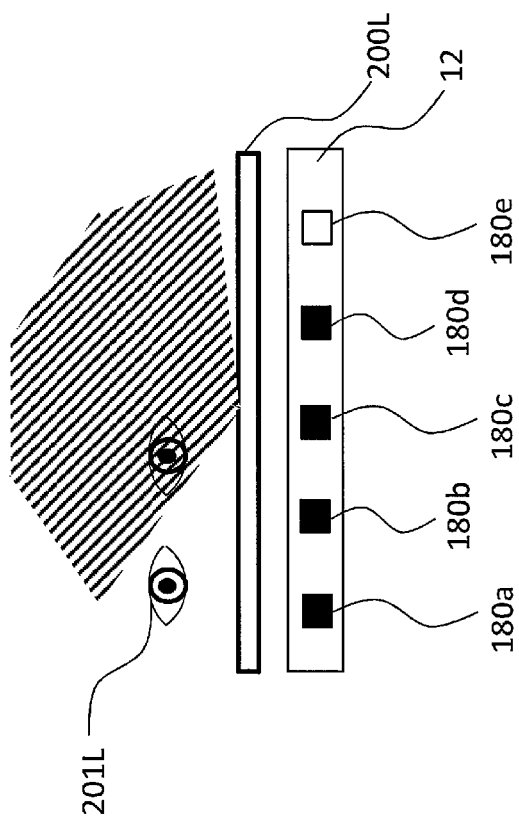

In a modification of this embodiment, two zones can be used in different directions according to multiple viewer positions, and can be changed according to one or more viewer's changing position. This is illustrated in FIGS. 21d and 21e where the viewer has moved laterally with respect to their position in FIGS. 21a-21c, and the light sources 180d and 180e are now used sequentially to provide a time-multiplex autostereoscopic display. Selecting which zones to use to provide a time-multiplex autostereoscopic display in dependence on the viewer's position can be done with known motion/position detectors and controllers.

An illuminator of the invention can also be used with existing parallax barrier or lenticular barrier methods for an autostereoscopic display to improve efficiency in directing light only in the directions accepted by the barrier/lens system to the viewer.

Figure 22:
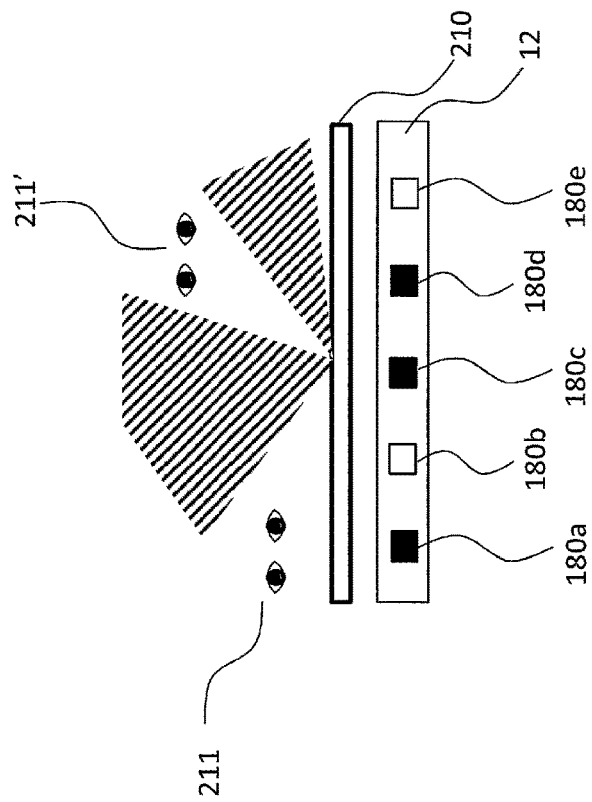

In a further embodiment shown in FIG. 22, the zones can be widely separated in order to display information 210 to two different viewers 211 and 211' in order to save energy in the illumination of the SLM. If the two viewers are to be shown the same information both zones can be illuminated simultaneously. Alternatively, the zones may be illuminated one at a time, sequentially, to show two different images to the two viewers such as a driver and passenger in a car. Another application is sending different signs or advertisements in different directions in a retail environment. The separated zones may also have multiple zones for higher efficiency or autostereoscopic viewing. In this case the zones are asymmetric, and this can be achieved by appropriate positioning of the light sources.

Figure 23:
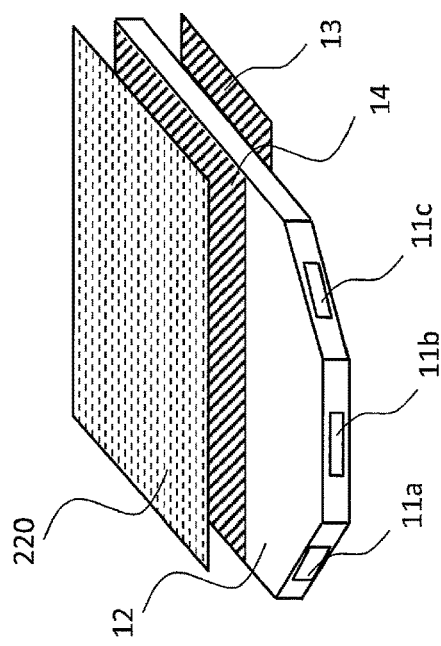

In a further embodiment shown in FIG. 23, a diffuser 220 can be used on top of the lightguide in order to widen the viewing zones and also reduce any potential Moire problems and increase manufacturing yield. The diffuser can be two or one dimensional. The one dimensional diffuser can be used to maintain the zone separation but diffuser the light along the zones in order to improve the viewer without diffusing the zones. A holographic, lenticular lens or other diffuser can do this.

In a further embodiment shown in FIGS. 24a to 24c, the angle of separation of the zones can be increased by curving the top surface of an additional film 230 above the lightguide. This curved surface can be on the top of a turning film as described above (FIG. 24b). The curve may also be as microstructure, such as Fresnel lens components 231 (FIG. 24c). FIG. 24a shows the prime embodiment. The figures show an increase zonal separation 232, but a reduced one is also possible.

Figure 25:
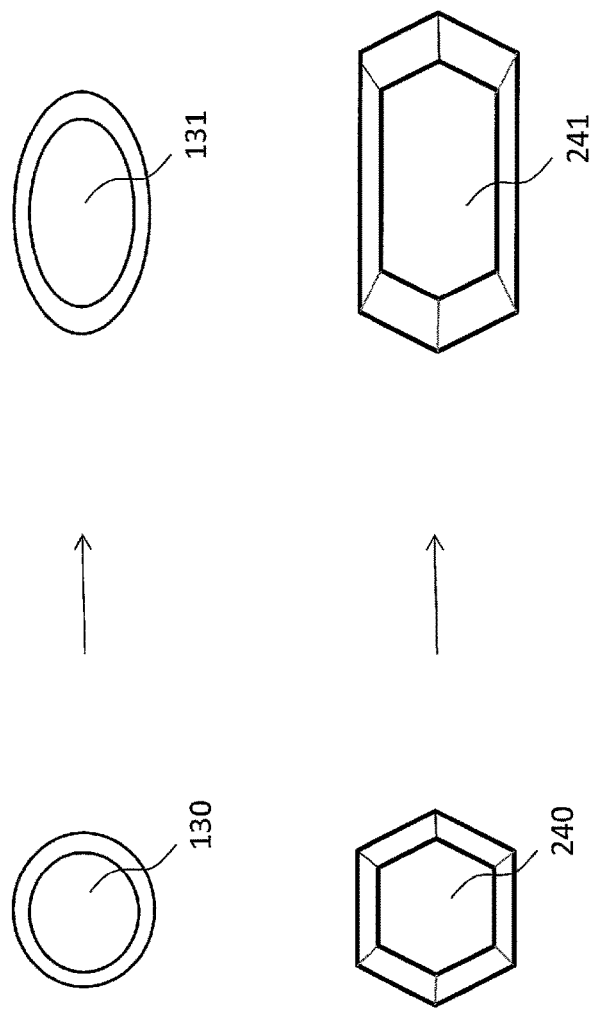

In a further embodiment shown in FIG. 25, the extraction features can be hexagonal shapes of differing "eccentricity". In comparison to the elliptical features of differing eccentricity 130 and 131, corresponding hexagonal structures 240 and 241 can be used. Higher order polygonal shapes can also be used. The slope angle can be the same as that corresponding in the elliptical or other cases. These are expected to be easier to manufacture using a diamond cutting technique. The sloping sides can be chosen to match a curved pattern where multiple sides of multiple extraction features can be cut in a single slice cut.

As above, the hexagonal shapes may have wing structures or become asymmetric in order to change the value of EEZRF relative to EERF in order to improve uniformity at the sides for shorter lightguide designs.

Sets of different shapes with similar sides are also possible. Another example which does not require a turning film are triangular prism microstructures at an approximate angle of 45° to the light direction. The curvature of the slope varies so as to give differing ZRF functions. The prisms can be arranged to be centered about the central light source as previously and can be individually positioned. The side angles of the wedges can be adjusted also to provide EEZRF/EERF correction as before.

Figure 26:
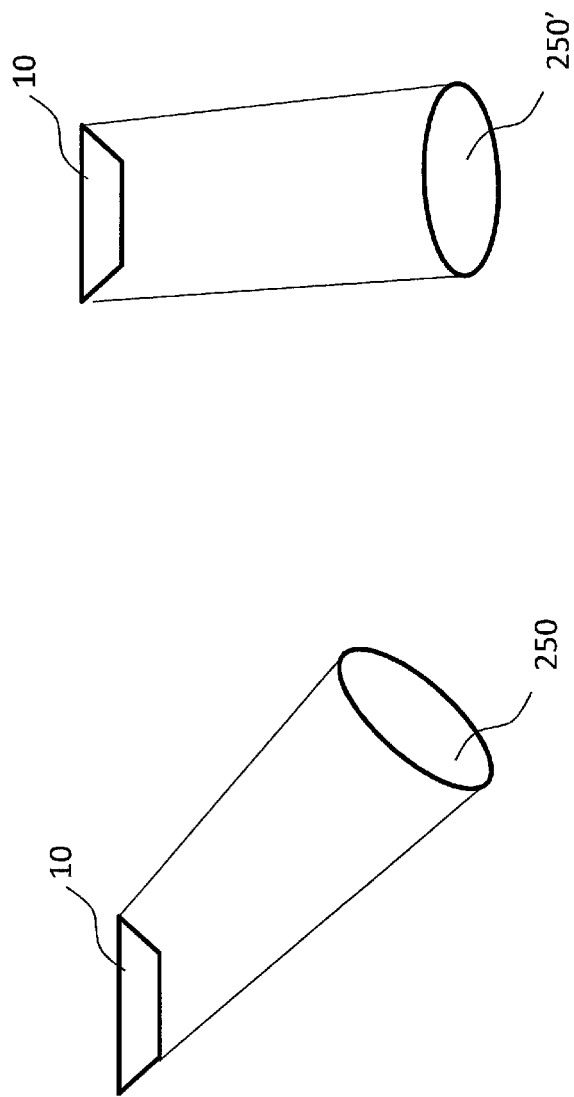

In a further embodiment shown in FIG. 26, the flat illuminator can be used as a luminaire for manual direction control or automatic illumination with energy saving and reduced glare. The flat illumination system 10 can be wall or floor mounted and the light can produce a wide angle or different zones 250 and 250'. Multiple zones can be shone at once and can form part of an intelligent lighting system. Current spotlights use single sources and curved reflectors which, when viewed by a viewer form small focus spots on the surface of the retina creating glare. This can be a problem for many people, especially the old and with certain eye problems such as AMD. This illumination system is large and uniform so the image of the source on the retina is much larger. Thus for a given surface illuminance, the retinal brightness is much lower in the flat illuminator case. In addition the flat form factor offered by this approach would give mounting, design and use options for lighting designers that would not be possible for the thicker mirrored spotlight systems. The application can be in retail or entertainment centers, for example.

In a further embodiment that can incorporate all of the above embodiments, it is not necessary at all the light sources be of the same colour. In backlighting applications it is desirable to have the same colour but in advertising or signage applications, different colours may be desirable.

In a further embodiment, extraction features can be in a particular polygonal shape, where two faces face backwards and the rest forward. For example, a pentagonal extraction feature 270 can be envisaged as shown in FIGS. 27a and 27b. This feature is for use with three light sources, a central and two sides sources as envisaged in FIG. 2. In this example, the feature extends vertically perpendicularly from the lightguide. The cross-section (parallel to the light extraction surface) of the feature at any height above the light extraction surface is a scaling of the cross-section (parallel to the light extraction surface) of the feature at any other height above the light extraction surface point—so that the internal angles of the polygonal cross-section remain constant throughout the vertical extent of the extraction feature. In mathematic terms, the cross section of the feature at one height above the light extraction surface is "similar" to the cross section of the feature at another height above the light extraction surface. In this example the feature tapers (that is, reduces) in size with height given by the tilt angle 276. The resulting feature consists of three faces 271a, b and c which face forward, away from the light sources.

The "central axis" of the feature, 272, is defined, for a light extraction feature having a polygonal cross-section with an odd number of sides, as the plane perpendicular to the central edge and passing through the centre of the central edge. Alternatively, and particularly in the case of a light extraction feature having a polygonal cross-section with an even number of sides the central axis may be defined as the axis intended to be the central area, or as between the innermost edges that define the smallest viewing zone separation from the normal (smallest altitudes)). In the case of an extraction feature which is positioned along a line of symmetry of the lightguide, the "central axis" defines an axis of symmetry for the feature since an extraction feature on the axis of symmetry of the lightguide is preferably symmetrical about the axis of symmetry of the lightguide. However, as explained below, an extraction feature positioned away from the line of symmetry of the lightguide is preferably not symmetrical.

An extension to higher order polygons is also possible for a larger number of viewing zones. That is, if there are n zones, the extraction features may have n sides facing forwards away from the light sources and two sides facing backwards, giving a total of n+2 sides. For example, FIGS. 27c and 27d shows a septagonal extraction feature for use in an embodiment having 5 zones where five sides 274a,b,c,d,e are facing forward, with a similarly defined axis 275. Further discussion will describe the three zone case with a pentagonal extraction feature and it is understood that it can be generalized to multiple zones, which can be symmetric or asymmetric and with even or odd numbers of zones.

FIG. 28a shows the lightguide 12 and turning film 120 from a side perspective. In this case the normal to the panel 330 is shown defining the altitude of the output ray 331 as the angle to the normal.

FIG. 28b shows a top view of rays reaching and leaving an extraction feature 290a. Light travelling along the axis 41 from the center LED 11b reaches the feature and is extracted by the center side, and is extracted perpendicular to the turning film to create a ray of zero altitude 332. The direction angle 334 is the rotation angle of the extraction feature required to ensure that the extracted ray is perpendicular and defines the zero at this point for the azimuth of this ray.

Light 293 from the left LED 11a meets the right side surface and is extracted into the right zone (which is typically at 90 degrees to the symmetry axis of the zones 335). However the azimuth value of this output ray 293' is the angle 333 relative the normal to the prism surfaces and the center LED light direction 41.

Figure 29:
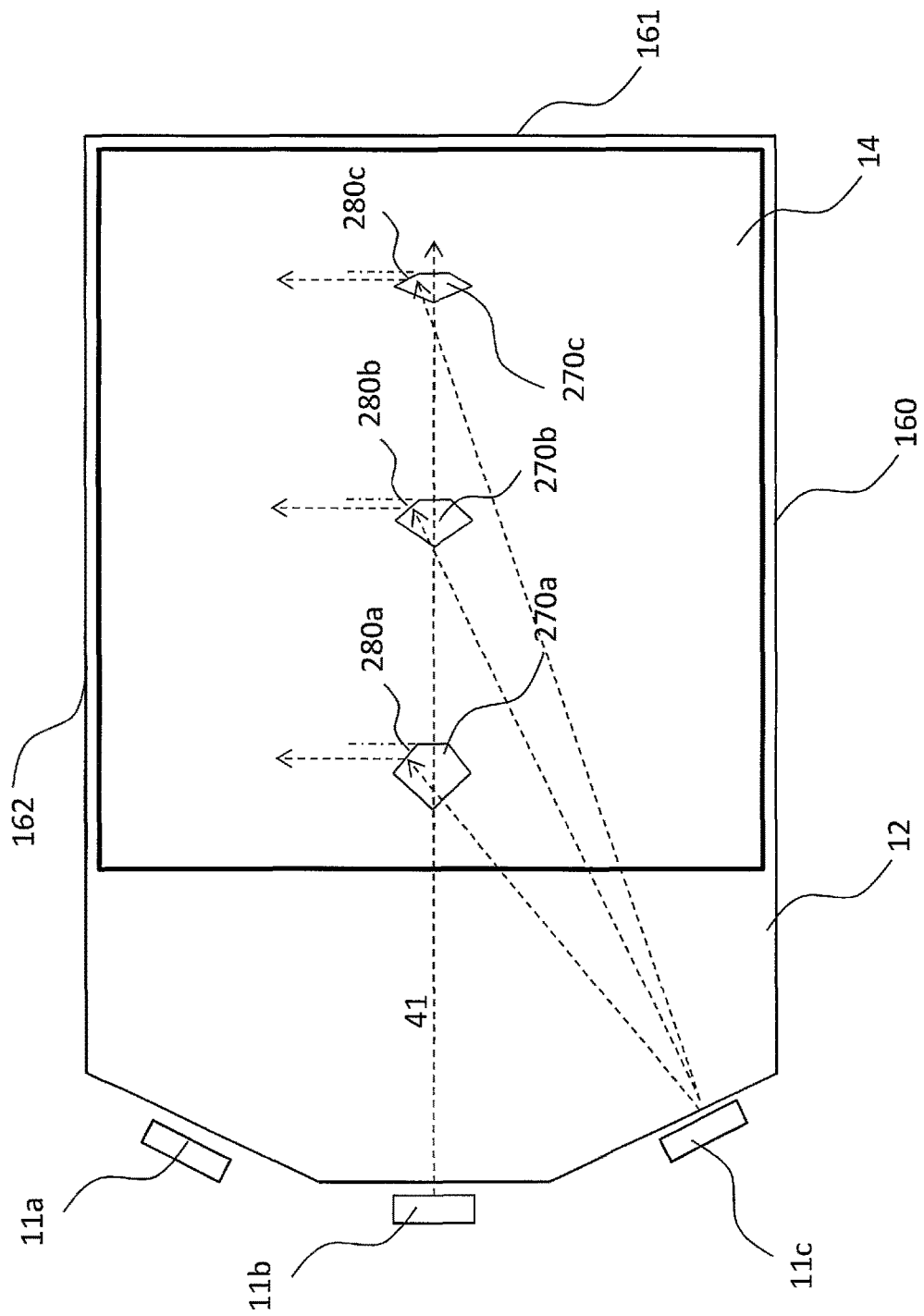
FIG. 29 A plan view showing extraction features positioned in the centre of the lightguide FIG. 30 A plan view illustrating rotation of extraction features spaced away from the centre of the lightguide FIG. 31 Plan views showing extraction features at the edge of the lightguide illuminated by different LEDs FIG. 32 Illustration of the lengths of the sides of the extraction features FIG. 33 A lightguide having multiple sets of zones according to a further embodiment of the invention

FIG. 29 illustrates the top view of a backlight as described above and in FIG. 12. The turning film may be used in this arrangement though not shown in this or succeeding figures. A three zone backlight is described consisting of lightguide 12, three independently controllable LEDs 11a,b,c and an active area 14 consisting of extraction features of the type shown in FIG. 27a though with differing cross section shape as a function of position and a variable size and or density. This section will describe how the shape and distribution of extraction features is determined for the optimization of uniformity and efficiency for the three viewing zones.

Extraction features 270a,b,c on the axis of symmetry of the lightguide illustrate the principle whereby light from the central LED 11b is extracted by each extraction feature by the central face of the feature, perpendicular to the light direction, extracting into the central viewing zone. Light from a side LED 11c is extracted by each extraction feature by a side face at an angle 280a,b,c to the central face. As the light coming from the side LED is at an angle to that from the central LED, and because this changes as a function of distance from the LEDs, the side angles also must vary as a function of distance away from the LEDs so as to extract the side light at the same angle.

Figure 30:
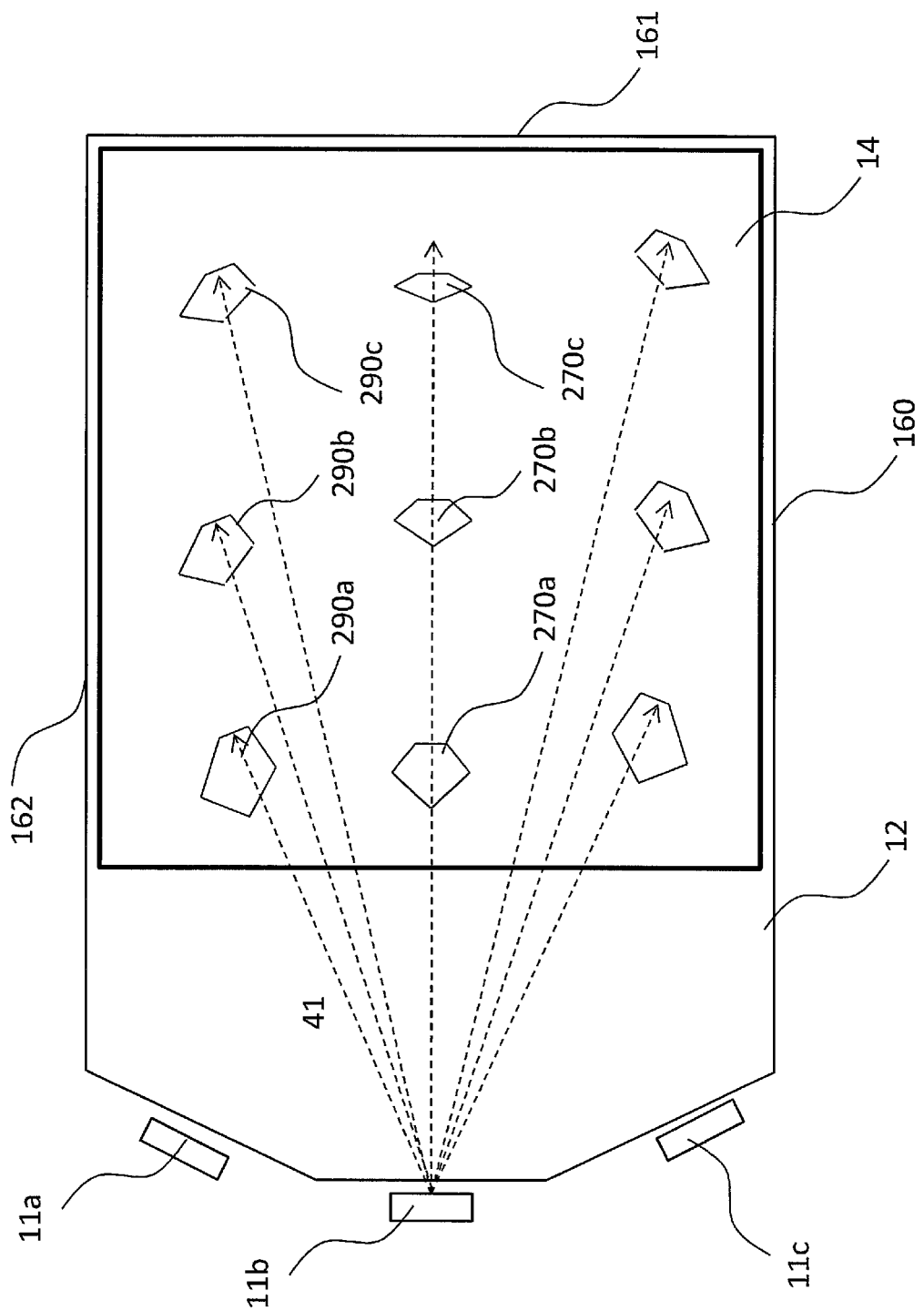

Off the symmetry axis, the extraction features are rotated, relative to the extraction features 270a,b,c on the axis of symmetry, so that the central face is still perpendicular to light from the central LED 11b—or, equivalently, the extraction features are oriented such that their central axis is parallel to light from the central LED 11b, where the "central axis" of an extraction feature is as defined above. In addition, the angle made from the two side LEDs to the central axis varies differently for the two sides, meaning that off-axis, the angles of the sides of the extraction features 290a,b,c are different, and the extraction features no longer are symmetrical. These are illustrated in FIG. 30—the direction 41 should be coincident with the central axis of the extraction features 272, for extraction features on the symmetry axis and for extraction features off the symmetry axis.

Figure 31A:
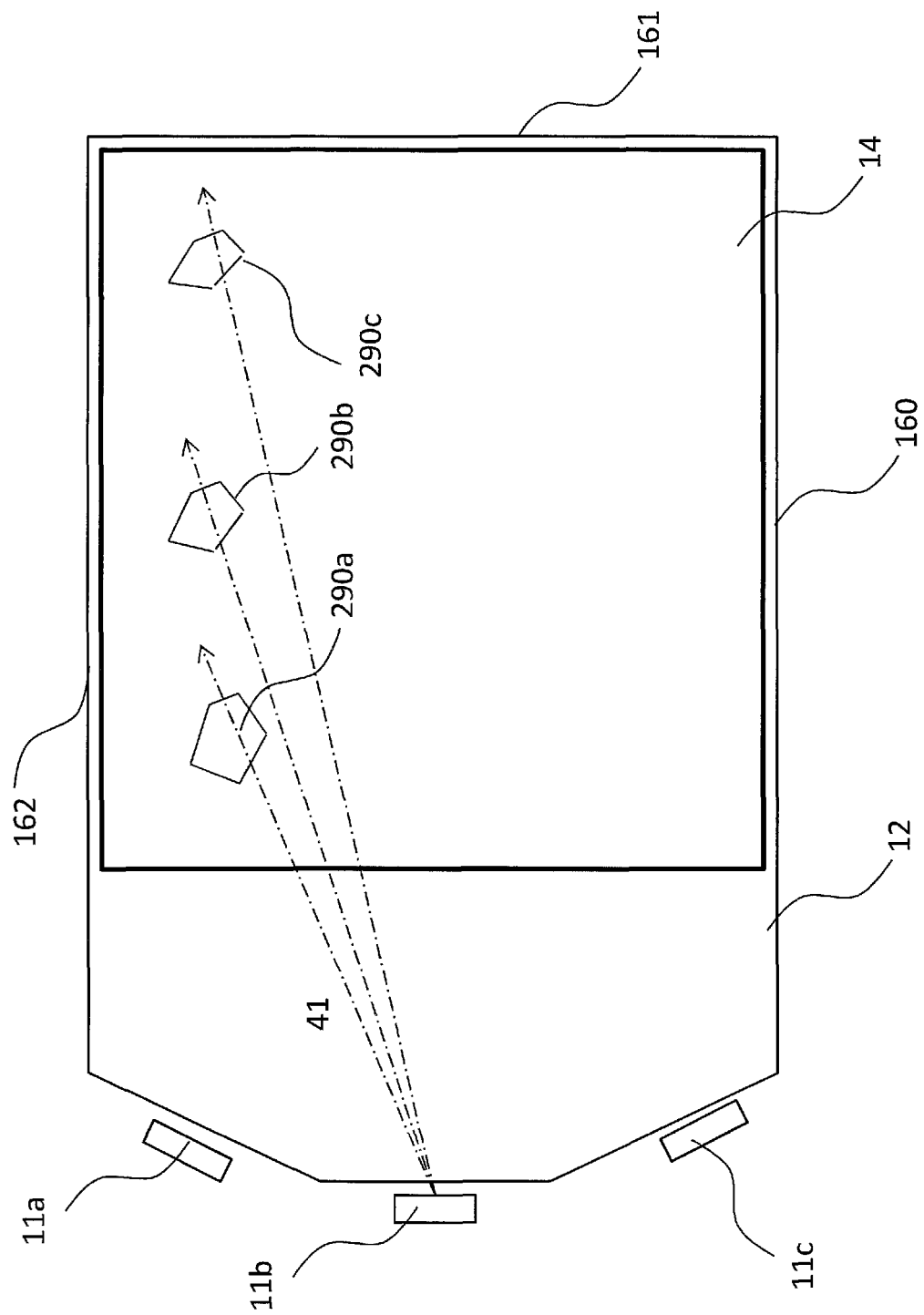
Figure 31B:
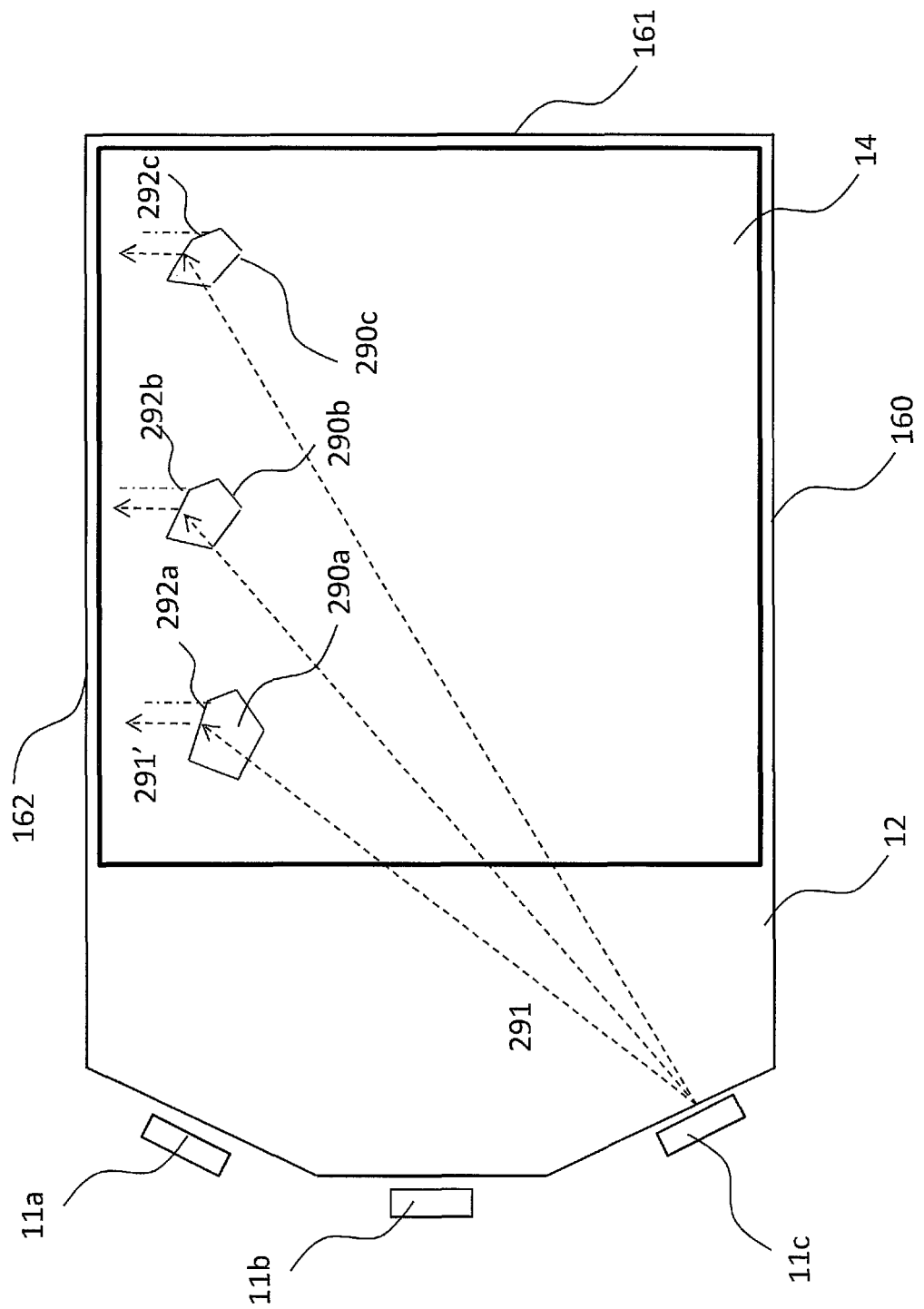
Figure 31C:
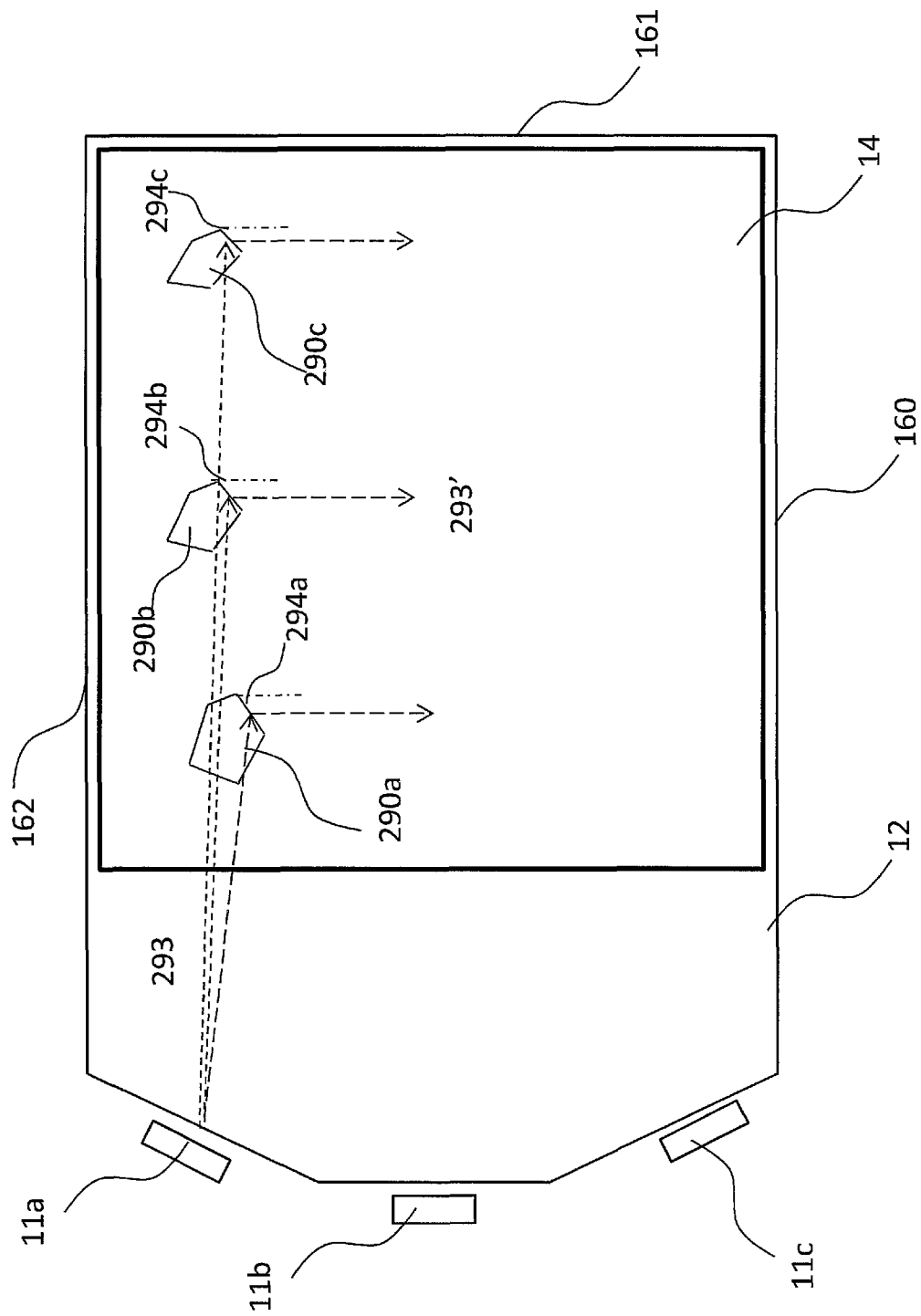

FIGS. 31a, 31b illustrate the off-axis extraction features' operation in more detail. FIG. 31a shows the light 41 from the central LED 11b. This determines the rotation angle 334 of the individual off axis extraction feature, compared to an on-axis extraction feature—as noted above, extraction features away from the symmetry axis are rotated, relative to extraction features on the axis of symmetry so that their central face is still perpendicular to light from the central LED 11b. FIG. 31b illustrates the orientation of the right hand LED 11c light 291 and its refraction at the left hand side. The angles 292a,b,c of the extraction features (being the angles made by the side edge faces relative to the central face, for example the angle between the side face 271a and the central face 271b in FIG. 27b) are such that the output light through the turning film 291' is the same altitude angle for all the extraction features. Note that the angles would be different for each position. In addition, as the azimuth angle is defined relative to the central LED axis (which is normal to the turning film prism directions and central side face), the output light azimuth angle is different for each extraction feature even if the output light is parallel. FIG. 31c shows a similar result for light 293 from the left LED 11a which is refracted by the right sides that have differing angles 294a,b,c such that the output light 293' after the turning film have the same altitude and are parallel, even if they have differing azimuths. This needs to be taken into account in the subsequent optimization procedure.

Figure 32:
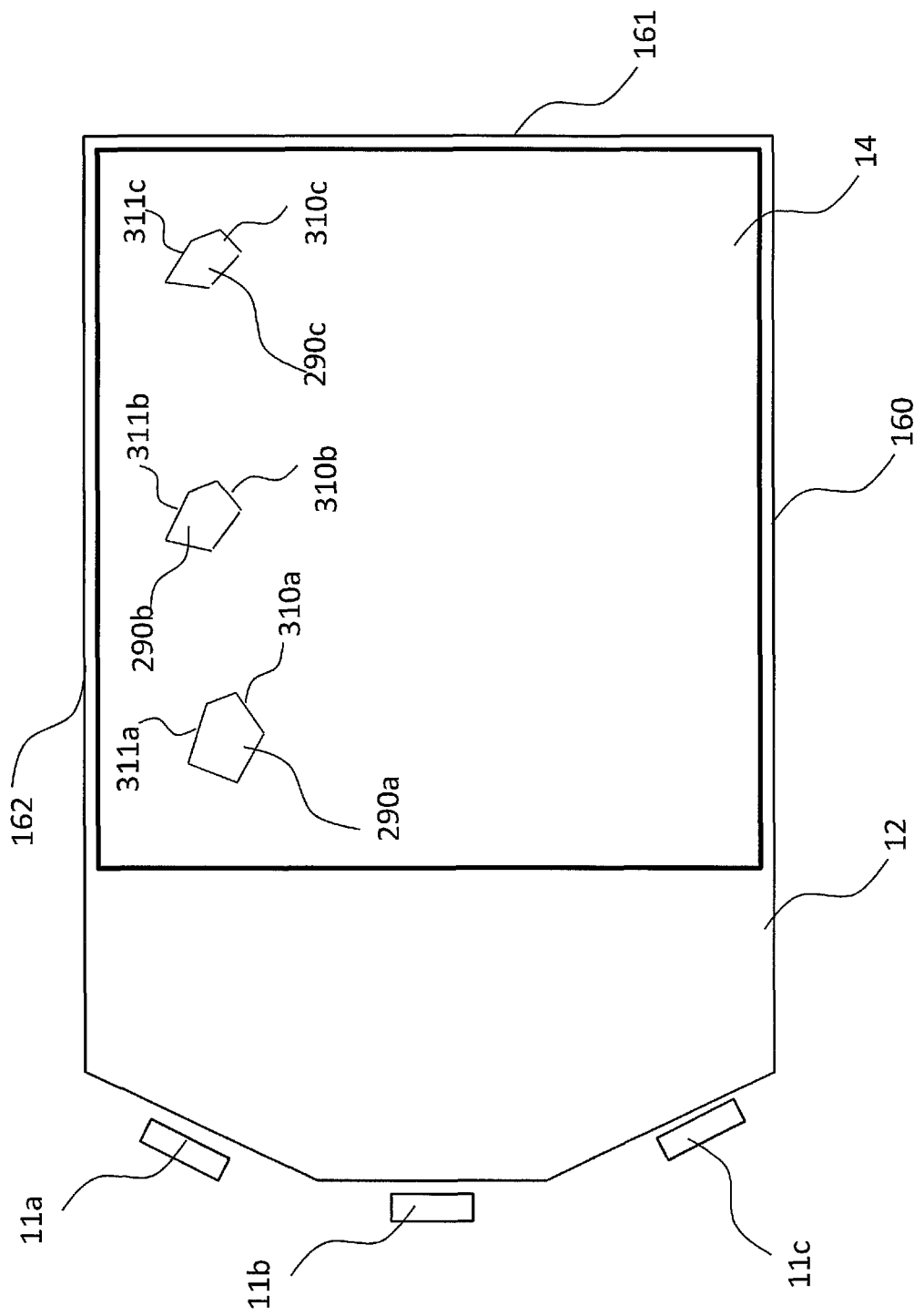

In addition to the angles, in order to make all of the zones appear uniform, the lengths of the two sides must also be varied with position along with the density of the features. This is illustrated in FIG. 32 where the left sides 311a,b,c and the right sides 310a,b,c are varied independently of one another and in dependence on the position of the extraction features in order to achieve a uniform backlight.

Although the invention has been described with reference to examples in which the light extraction features are associated with a single reference point, and one light source (or one group of light sources) 11a, 11b, 11c is provided to illuminate each zone, the invention is not limited to this. For example, in FIG. 33, the active area 324 of the lightguide has two sub-areas 324a, 324b whose boundary is indicated by the broken line. Each sub-area 324a, 324b is provided with a separate set of light extraction features, each set associated with its own respective reference point. In the example of FIG. 33 the set of light extraction features provided in/on the first sub-area 324a (the upper sub-area as shown in FIG. 33) is associated with a reference point coincident with the light source 321a whereas the set of light extraction features provided in/on the second sub-area 324b (the lower sub-area as shown in FIG. 33) is associated with a reference point coincident with the light source 321b (although, as noted above, it is not necessary for the reference point to be coincident with the position of a light source). Furthermore, the illumination system of FIG. 33 has one set of light sources (or one set of groups of light sources) 320a, 321a, 322a) that, when illuminated, direct light into the first sub-area 324a of the active area of the lightguide for extraction from the surface of the first sub-area 324a of the lightguide by the light extraction features provided in/on the sub-first area 324a of the lightguide, and has another set of light sources (or set of groups of light sources) 320b, 321b, 322b) that, when illuminated, direct light into the second sub-area 324b of the active area of the lightguide for extraction from the surface of the second sub-area 324b of the lightguide by the light extraction features provided in/on the second sub-area 324b of the lightguide. The light extraction features provided in/on the first sub-area 324a of the lightguide are arranged according to the present invention, for example according to any of the examples described herein, based on the reference point for these light extraction features (for example based on a reference point coincident with the light source 321a), and the light extraction features provided in/on the second sub-area 324a of the lightguide are arranged according to the present invention, for example according to any of the examples described herein, based on the reference point for these light extraction features (for example based on a reference point coincident with the light source 321b). It will however be understood that references to "axis of symmetry of the lightguide", or similar, in the description of the previous embodiments would, in the embodiment of FIG. 33, instead refer to an axis of symmetry of a sub-area of the lightguide.

The light sources (or groups of light sources) 320a, 321a, 322a, 320b, 321b, 322b are preferably all independently controllable from one another.

The illumination system of FIG. 33 has more than one LED (or other light source) for each output zone. In FIG. 33 320a,b represent LEDs which direct light into the light guide in the same direction as one another so that light from both LEDs 320a,b is extracted into the right output zone. Similarly, 321a,b represent LEDs that shine into the center output zone and 322a,b represent LEDs that shine into the left output zone. LEDs that direct light into the light guide in the same direction as one another (eg 320a,320b) are controllable independently from one another. If both LEDs 320a, 320b are ON a wide illuminated area is obtained, and if only one of LEDs 320a,320b is ON a narrow illuminated area is obtained—in both cases light is extracted into the right output zone is illuminated.

The illumination system of FIG. 33 has the further advantage that a wide active area of the lightguide can be obtained by illuminating both sub-areas 324a,324b, while a narrow active area of the lightguide can be obtained by illuminating just one of the sub-areas 324a or 324b. Furthermore, it is still possible to control the angular range of the output light in the manner previously described.

Optimization of the backlight can then be done using known methods of optical optimization with apparent uniformity of N zones being the target and the density and (N−1) lengths of the sides being the variables.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

Industrial application in switchable window displays in mobile, mid-sized and TV displays for efficiency improvement and directional user switching. Application also in 3D, veil view and dual view directional displays for improved quality and lower cost of components. Applications are also in smart lighting for unique low thickness directional lighting. There is no current thin lightguide based technology for zonal switching for mobile displays.

REFERENCE SIGNS LIST

10: The prime embodiment and overview of the invention
11a, 11b, 11c: three light sources for a three zone illuminator
12: Lightguide
13: Reflective sheet behind lightguide
14: Area of extraction features (active area)
21: left viewing zone of a three zone display
22: Centre viewing zone of a three zone display
23: right viewing zone of a three zone display
24: single wide viewing window
31: Light radiating from the light source 11a
32: Light radiating from the light source 11b
33: Sloping side of the lightguide for the edge light sources.
41: The set of axial directions (light rays) centered on the central light source
51: The light ray from the side light source
52: Angle made from the side light source to 41
53: Light extracted from the lightguide from 41
54: Light extracted from the lightguide from 51
55: Angle between 53 and 54
61: Light extracted into the viewing zone from the side light source
62: Light extracted but not into the viewing zone from the side light source
91: Extracted light from an extraction feature
92: Footprint area of the extraction feature
93: Incident light onto an extraction feature
94: A light deviating edge of an extraction feature
101: Light from light source 11a meeting 102
102: Light from light source 11c meeting 101
120: Curved turning film of the prime embodiment example
121: The curved lines of prisms on the turning film
122: The line along the radius of the concentric prisms
123: The peak angle of the prisms
130: Circular truncated cone extraction feature
131: Elliptical truncated cone extraction feature
132: Slope angle of the truncated cone feature
133: Expanding axis of the extraction feature
134: Non-expanding axis of the extraction feature
140: Angular response of the circular extraction feature with turning film
141: Angular response of the elliptical extraction feature with turning film
150: Distance between the light source and active area
160, 161, 162: edges of the lightguide
163 and 164: sides of an extraction feature
165 and 166: directions from the side LEDs to an asymmetric location.
180a, 180b, 180c, 180d, 180e: Light sources for a five zone illuminator
190: SLM such as a liquid crystal display panel
191: Convergence point of the circular structures.
200L and 200R: Stereoscopic image pair shown on an SLM
201L and 201R: Left and right eyes of a viewer
210: image displayed on a zonal display system
211: A viewer of a zonal display system
220: one or two dimensional diffuser
230: Curved top surface to increase zone separation
231: Microstructure on top surface to improve zone separation
240: Regular hexagonal extraction feature
241: elongated hexagonal extraction feature
250: Illumination zones from a flat directional luminaire
270: Pentagonal extraction feature
271a, b, c: Left, centre and right sides of the pentagonal extraction feature
272: Perpendicular to the central side of pentagonal feature
273: Septagonal extraction feature
274a, b, c, d, e: Active sides of the septagonal extraction feature
275: Perpendicular to the central side of septagonal feature
276: Tilt angle of the side of the extraction feature
277: Back angle of the extraction feature
280a, b, c: Left side angle of the on-axis extraction features
290a, b, c: Off-axis (asymmetrical) pentagonal extraction features
291: Direction of light incident from the right LED to the extraction features
291': Left output light after refraction of the extraction features and turning film
292a, b, c: Left side angle of the off-axis extraction features
293: Direction of light incident from the left LED to the extraction features
293': Right output light after refraction of the extraction features and turning film
294a, b, c: Right side angle of the off-axis extraction features
310a,b,c: Length of the right side edge of the off-axis extraction features 311a,b,c: Length of the left side edge of the off-axis extraction features 320a,b: Right LEDs in a three-zone backlight with two areas 321a,b: Centre LEDs in a three-zone backlight with two areas 322a,b: Left LEDs in a three-zone backlight with two areas 323: Two-area lightguide 324: Active area for a two-area lightguide 324a: first sub-area of the active area for a two-area lightguide 324b: second sub-area of the active area for a two-area lightguide 330: Normal to the top surface of the backlight 331: Output ray altitude angle 332: Output ray from the central LED through an off-axis extraction feature 333: Output ray azimuth angle 334: Rotation angle of the extraction feature

The invention claimed is:

1. An illumination system comprising:
a lightguide having a plurality of light extraction features arranged to extract, through a light extraction surface of the lightguide, light propagating within the lightguide; and
a plurality of independently controllable light sources arranged to introduce light into spatially separated parts of one edge face of the lightguide;
wherein each light extraction feature of the plurality of light extraction feature serves to extract light from each of the plurality of independently controllable light sources along a corresponding direction in space, each light extraction feature has a preferred direction, light propagating within the lightguide that is incident on a light extraction feature along the preferred direction of the respective light extraction feature being extracted from the surface of the lightguide in a direction parallel to a reference plane crossed with the light extraction surface of the lightguide, and light propagating within the lightguide that is incident on a light extraction feature not along the preferred direction of the respective light extraction feature being extracted from the surface of the lightguide at an extraction angle to the reference plane, the extraction angle being related by a response function to an incident angle between the light propagation direction and the preferred direction of the light extraction feature;
wherein the light extraction features are oriented such that the preferred direction of a respective light extraction feature is directed towards a reference point or towards a respective reference point;
wherein each of the light extraction features is configured such that the response function of the respective light extraction feature differs in order that a given change in the incident angle results in a greater change in the extraction angle relative to the change in the incident angle as the distance of the respective light extraction feature from the reference point or from the respective reference point increases; and
wherein, respective to incident light from each of the plurality of independently controlled light sources, each of the light extraction features exhibits a correspondingly same relative angle of extraction.

2. An illumination system as claimed in claim 1 wherein the shape, at the light extraction surface, of the light extraction features varies with distance from the reference point so that the response function between the incident angle and the extraction angle light extraction increases with increasing distance from the reference point or from the respective reference point.

3. An illumination system as claimed in claim 2 wherein an aspect ratio of the light extraction features decreases with distance from the reference point or from the respective reference point, the aspect ratio of the light extraction feature being the extent, at the light extraction surface, of the light extraction feature in the preferred direction divided by the extent, at the light extraction surface, of the light extraction feature in a direction perpendicular to the preferred direction.

4. An illumination system as claimed in claim 3 wherein the extent, at the light extraction surface, of the light extraction feature in the preferred direction does not increase as the distance of the light extraction feature from the reference point or from the respective reference point increases.

5. An illumination system as claimed in claim 1 wherein the reference plane is perpendicular to the light extraction surface.

6. An illumination system as claimed in claim 1 wherein the number per unit area of the light extraction features increases with distance from the reference point or from the respective reference point.

7. An illumination system as claimed in claim 1 wherein the area, at the light extraction surface, of the light extraction features increases with distance from the reference point or from the respective reference point.

8. An illumination system as claimed in claim 1 wherein, at the light extraction surface, the light extraction features are generally circular or generally elliptical.

9. An illumination system as claimed in claim 1 wherein, at the light extraction surface, the light extraction features are polygonal.

10. An illumination system as claimed in claim 1 wherein the light extraction features contain at least one face that extends generally parallel to the preferred direction of the light extraction feature.

11. An illumination system as claimed in claim 10 wherein, at the light extraction surface, the light extraction features are T-shaped and are oriented with the stem of the T extending along the preferred direction.

12. An illumination system as claimed in claim 1 wherein, at the light extraction surface, the light extraction features are asymmetric about their preferred direction.

13. An illumination system as claimed in claim 1 wherein the light extraction features have a common reference point, the illumination system being mirror-symmetric about a longitudinal axis passing through the reference point.

14. An illumination system as claimed in claim 1 wherein sets of light extraction features are provided in/on respective sub-areas of the lightguide, each set of light extraction features having a respective reference point; and wherein the light sources are arranged in sets for, when illuminated, directing light into respective sub-areas of the lightguide.

15. An illumination system as claimed in claim 1 wherein one of the light sources is disposed adjacent the reference point or wherein one of the light sources of a set of light sources is disposed adjacent the reference point of the associated set of light extraction features.

16. An illumination system as claimed in claim 1 and further comprising an optical turning film disposed over the light extraction surface of the lightguide.

17. An illumination system as claimed in claim 1 wherein the one edge face comprises a plurality of facets, each of the light sources being arranged to introduce light into a respective facet.

18. An illumination system as claimed in claim 1 wherein the light extraction surface of the lightguide is substantially flat.

19. An illumination system as claimed in claim 1, and having n independently controllable light sources or wherein a set of light sources includes n independently controllable light sources, wherein the cross-section, at the light extraction surface, of the light extraction features is polygonal with n+2 sides, with n sides facing away from the light sources or from the respective set of light sources and two sides facing towards the light sources or towards the respective set of light sources.

20. A display comprising an illumination system as defined in claim 1 and a spatial light modulator disposed in the path of light from the illumination system to an observer.

* * * * *